(12) United States Patent
Da Silva et al.

(10) Patent No.: US 10,284,729 B2
(45) Date of Patent: May 7, 2019

(54) METHOD AND APPARATUS FOR SUBSCRIPTION ADAPTATION

(71) Applicant: Telefonaktiebolaget LM Ericsson (publ), Stockholm (SE)

(72) Inventors: Icaro L. J. Da Silva, Bromma (SE); Åsa Bertze, Spånga (SE); Jing Fu, Solna (SE); Yu Wang, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 253 days.

(21) Appl. No.: 15/110,675

(22) PCT Filed: Apr. 14, 2014

(86) PCT No.: PCT/SE2014/050464
§ 371 (c)(1),
(2) Date: Jul. 8, 2016

(87) PCT Pub. No.: WO2015/108461
PCT Pub. Date: Jul. 23, 2015

(65) Prior Publication Data
US 2016/0337525 A1 Nov. 17, 2016

Related U.S. Application Data

(60) Provisional application No. 61/927,639, filed on Jan. 15, 2014.

(51) Int. Cl.
H04M 11/00 (2006.01)
H04M 15/00 (2006.01)
(Continued)

(52) U.S. Cl.
CPC .... *H04M 15/8027* (2013.01); *H04L 12/1485* (2013.01); *H04M 15/58* (2013.01);
(Continued)

(58) Field of Classification Search
CPC combination set(s) only.
See application file for complete search history.

(56) References Cited

U.S. PATENT DOCUMENTS 6,532,281 B1 * 3/2003 Schoenborn .......... H04M 15/00
379/114.01
6,681,106 B2 1/2004 Marsh et al.
(Continued)

FOREIGN PATENT DOCUMENTS

EP 2 398 262 A1 12/2011
EP 2466790 A1 6/2012
WO WO 03/056753 A1 7/2003

OTHER PUBLICATIONS

International Search Report, Application No. PCT/SE2014/050464, dated Jan. 21, 2015.
(Continued)

*Primary Examiner* — Shantell L Heiber
(74) *Attorney, Agent, or Firm* — Sage Patent Group

(57) ABSTRACT

A subscription adaptation engine computes a network utilization metric for a plurality of resource bins, each resource bin representing the network utilization at a network location within a time slot. A subscriber utilization metric is computed for activities by a subscriber within the resource bins and a subscriber predictability metric is computed for the subscriber based on the subscriber utilization metric and network utilization metric. Subscriber profiling is performed for the subscriber based on the subscriber utilization metrics and subscriber predictability metric and a subscription profile for the subscriber is adapted, thereby enabling service charging based on the adapted subscription profile. The amount of real-time or near real-time signaling needed to show a different price for each location and/or time of a user may thereby be reduced.

28 Claims, 16 Drawing Sheets

(51) Int. Cl.
*H04W 4/24* (2018.01)
*H04L 12/14* (2006.01)
*H04W 8/18* (2009.01)

(52) U.S. Cl.
CPC ......... *H04M 15/66* (2013.01); *H04M 15/80* (2013.01); *H04M 15/8033* (2013.01); *H04M 15/8083* (2013.01); *H04M 15/81* (2013.01); *H04W 4/24* (2013.01); *H04W 8/18* (2013.01)

(56) References Cited

U.S. PATENT DOCUMENTS

| | | | | |
|---|---|---|---|---|
| 6,792,273 | B1* | 9/2004 | Tellinger | H04W 28/26 370/331 |
| 7,717,334 | B1* | 5/2010 | Rolf | G06Q 40/12 235/380 |
| 8,655,307 | B1* | 2/2014 | Walker | H04W 52/0212 455/405 |
| 9,026,100 | B2* | 5/2015 | Castro Castro | H04L 12/14 370/252 |
| 2010/0197268 | A1 | 8/2010 | Raleigh | |
| 2011/0320622 | A1 | 12/2011 | Cutler et al. | |
| 2012/0276867 | A1* | 11/2012 | McNamee | H04L 12/1407 455/406 |
| 2012/0329449 | A1* | 12/2012 | Das | H04W 52/0206 455/423 |
| 2013/0215758 | A1 | 8/2013 | Logan et al. | |
| 2013/0303114 | A1 | 11/2013 | Ahmad et al. | |
| 2014/0141743 | A1* | 5/2014 | Shaw | H04W 4/029 455/405 |

OTHER PUBLICATIONS

Written Opinion of the International Searching Authority, Application No. PCT/SE2014/050464, dated Jan. 21, 2015.
3GPP, Technical Specification—"3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.7.0 (Dec. 2013), 144 pp.
Press Release—"Personalized Data Plans and Real-Time Data Spending Control Top Service Providers' Wish Lists for New 4G Services". Telecom Reseller blog, accessed the Oct. 15, 2013 at http://www.telecomreseller.com/2012/12/12/personalized-data-plans-and-real-time-data-spending-control-top-service-providers-wish-lists-for-new-4g-services/, 4 pp.
Sen et al., "Pricing Data: A Look at Past Proposals, Current Plans, and Future Trends", accessed Oct. 15, 2013 at http://www.tc.umn.edu/~ssen/papers/Pricing_survey_TR.pdf, 13 pp.
Supplementary European Search Report and European Search Opinion, Application No. EP 14879205, dated Feb. 8, 2017, 8 Pages.
Communication pursuant to Article 94(3) EPC for European Patent Application No. 14879205.4 dated Aug. 7, 2018, 9 pages.

* cited by examiner iii) Usage-based

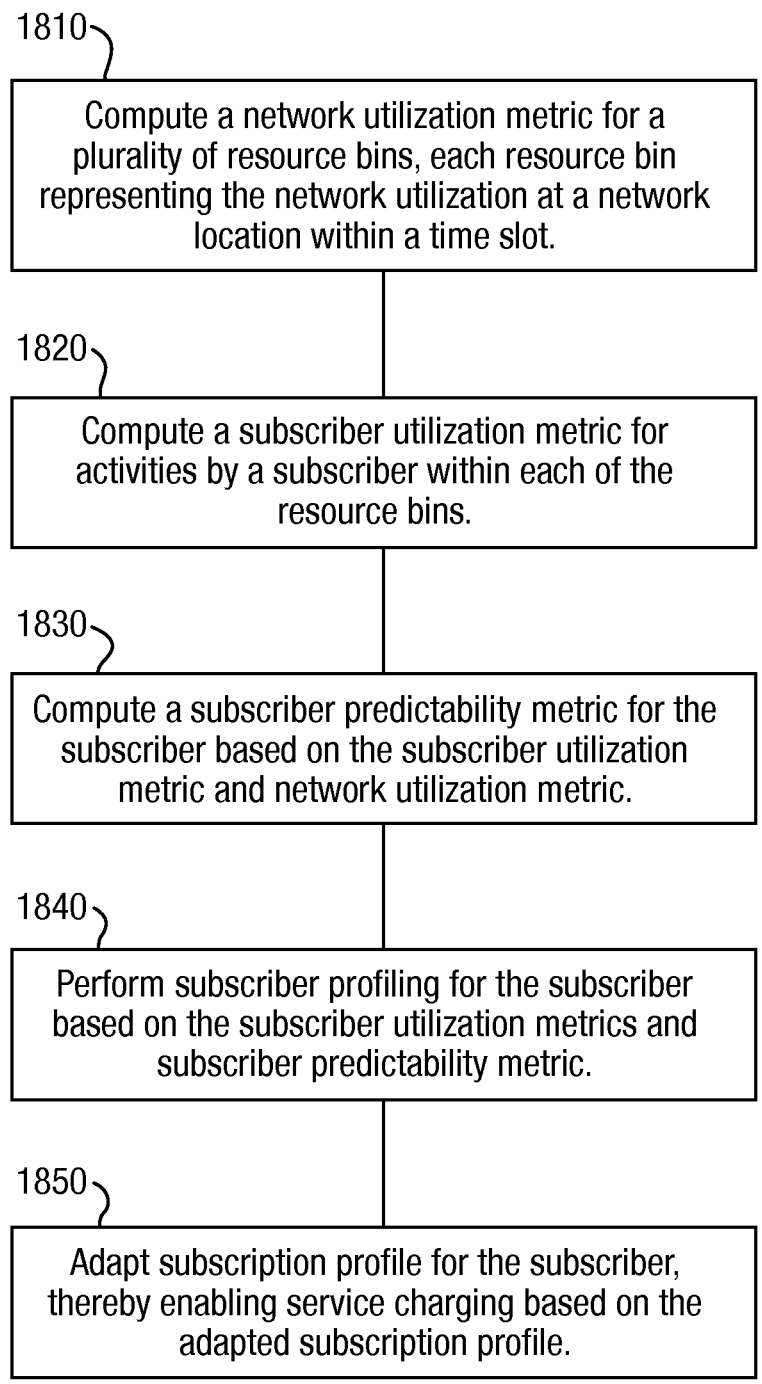

METHOD AND APPARATUS FOR SUBSCRIPTION ADAPTATION

CROSS REFERENCE TO RELATED APPLICATIONS

This application is a 35 U.S.C. § 371 national stage application of PCT International Application No. PCT/SE2014/050464, filed on Apr. 14, 2014, which itself claims the benefit of U.S. provisional Application No. 61/927,639, filed Jan. 15, 2014, the disclosure and content of both of which are incorporated by reference herein in their entireties. The above-referenced PCT International Application was published in the English language as International Publication No. WO 2015/108461 A1 on Jul. 23, 2015.

TECHNICAL FIELD

The present solution relates to methods, a subscription adaptation engine, an online charging system, a computer program and a computer program product for subscription adaptation based on network utilization.

BACKGROUND

Mobile networks are becoming increasingly ubiquitous in society. Initially, mobile networks were used simply for voice communication. However, more recently other types of communication services have been adapted to mobile networks. Text messages, music and video streaming, email, web browsing, and others have all been adapted to work with mobile networks. This increase in breadth of service has coincided with society's increased reliance on the connectivity provided by mobile networks. For example, in the past, a customer may have watched a movie over a cable connection, whereas now the movie may be sent to the user over a mobile network.

In certain instances, mobile network service to users may be provided by allocating a set amount of resources per user. For example, a user may pre-pay for 300 minutes, 20 texts, and/or 50 megabytes of data traffic for a given month.

Mobile network capacity is typically unaffected by the time of day or day of the week. In contrast, the usage of mobile network resources may be tied to a particular time of day (e.g., increased usage during the daytime). Such a usage pattern inefficiently uses the total capacity available in the mobile network.

One way of addressing the uneven network utilization is to implement a management solution that aims to change subscriber call patterns in a mobile network. A conventional solution may seek to decrease network traffic at peak times and increase network traffic during quiet times. This may be accomplished by adjusting rates based on the time of day or the location of a call/data session. Such a solution may be implemented to help operators more efficiently use their network capacity.

An example is disclosed in WO 2003056753 A1 which describes a system and method in a telecommunications network for billing a call placed by a user based on a reported traffic load in the network.

A problem related to such solutions is the high complexity that is needed in terms of real-time or near real-time signaling to show a different price for each location the user is entering. As an example, the cost of a voice call could be adjusted every hour, in each network cell, depending on the level of usage.

SUMMARY

It is an object of the invention to provide a method, a subscription adaptation engine, an online charging system, a computer program and a computer program product for subscription adaptation based on network utilization providing the ability to reduce the amount of real-time or near real-time signaling needed to show a different price for each location and/or time of a user.

A first aspect of the invention relates to a method for subscription adaptation based on network utilization. A Subscription Adaptation Engine computes a network utilization metric for a plurality of resource bins, each resource bin representing the network utilization at a network location within a time slot. A subscriber utilization metric is computed for activities by a subscriber within the resource bins and a subscriber predictability metric is computed for the subscriber based on the subscriber utilization metric and network utilization metric.

Subscriber profiling is performed for the subscriber based on the subscriber utilization metrics and subscriber predictability metric and a subscription profile for the subscriber is adapted, thereby enabling service charging based on the adapted subscription profile.

An advantage with the invention is that operators may apply discounts strategies that that are flexible and personalized taking into aspects such as the traffic and load the customer generates to the network and the fact the network may be underutilized in certain locations and/or time slots. The presented solution further provides a mechanism for the operator to provide personalized discounts and/or subscriptions to subscribers in a customer friendly way utilizing the existing infrastructure more efficiently.

A second aspect of the invention relates a Subscription Adaptation Engine, SAE, for subscription adaptation. The SAE comprises a processor circuitry and a memory which contains instructions that, when executed by the processor circuitry, cause the SAE to compute a network utilization metric for a plurality of resource bins, each resource bin representing the network utilization at a network location within a time slot. The memory does also contain instructions which cause the SAE to compute a subscriber utilization metric for activities by a subscriber within the resource bins and to compute a subscriber predictability metric for the subscriber based on the subscriber utilization metric and network utilization metric. Further, the memory contains instructions which cause the SAE to perform subscriber profiling for the subscriber based on the subscriber utilization metrics and subscriber predictability metric; and to adapt subscription profile for the subscriber, thereby enabling service charging based on the adapted subscription profile.

A third aspect of the invention relates to a Subscription Adaptation Engine, SAE, for subscription adaptation based on network utilization. The SAE comprises a network utilization metric computation module for computing a network utilization metric for a plurality of resource bins, each resource bin representing the network utilization at a network location within a time slot and a subscriber utilization metric computation module for computing a subscriber utilization metric for activities by a subscriber within the resource bins. The SAE also comprises a subscriber predictability metric computation module for computing a subscriber predictability metric for the subscriber based on the subscriber utilization metric and network utilization metric, a subscriber profiling module for performing subscriber profiling for the subscriber based on the subscriber utilization metrics and subscriber predictability metric, and a subscription profile adaptation module for adapting subscription profile for the subscriber, thereby enabling service charging based on the adapted subscription profile.

A fourth aspect of the invention relates to A Subscription Adaptation Engine, SAE, for subscription adaptation. The SAE comprises a processor circuitry and a memory containing instructions that, when executed by the processor circuitry, cause the Subscription Adaptation Engine to compute a network utilization metric for a plurality of resource bins, each resource bin representing the network utilization at a network location within a time slot and to compute a subscriber utilization metric for activities by a subscriber within the resource bins.

The memory also contains instructions that, when executed by the processor circuitry, cause the Subscription Adaptation Engine to compute a subscriber predictability metric for the subscriber based on the subscriber utilization metric and network utilization metric, to perform subscriber profiling for the subscriber based on the subscriber utilization metrics and subscriber predictability metric, and to adapt subscription profile for the subscriber, thereby enabling service charging based on the adapted subscription profile.

A fifth aspect of the invention relates to an Online Charging System, OCS, including an SAE, wherein the OCS is further adapted to perform service charging based on adapted subscription profile.

A sixth aspect of the invention relates to a computer program containing comprising computer readable code means, which when run in a computer being configured as a Subscription Adaption Engine, the computer readable code means causes the computer to compute a network utilization metric for a plurality of resource bins, each resource bin representing the network utilization at a network location within a time slot and to computing a subscriber utilization metric for activities by a subscriber within the resource bins.

The computer readable code means further causes the computer to compute a subscriber predictability metric for the subscriber based on the subscriber utilization metric and network utilization metric and to perform subscriber profiling for the subscriber based on the subscriber utilization metrics and subscriber predictability metric.

The computer readable code means further causes the computer to adapt subscription profile for the subscriber, thereby enabling service charging based on the adapted subscription profile.

A seventh aspect of the invention relates to a computer program product comprising a computer readable medium and a computer program stored on the computer readable medium. The computer program comprises computer readable code means, which when run in a computer being configured as a Subscription Adaption Engine, the computer readable code means causes the computer to compute a network utilization metric for a plurality of resource bins, each resource bin representing the network utilization at a network location within a time slot and to computing a subscriber utilization metric for activities by a subscriber within the resource bins.

The computer readable code means further causes the computer to compute a subscriber predictability metric for the subscriber based on the subscriber utilization metric and network utilization metric and to perform subscriber profiling for the subscriber based on the subscriber utilization metrics and subscriber predictability metric.

The computer readable code means further causes the computer to adapt subscription profile for the subscriber, thereby enabling service charging based on the adapted subscription profile.

Embodiments of the invention will now be described in more detail with reference to the enclosed drawings.

BRIEF DESCRIPTION OF THE DRAWINGS

FIG. 18 is a flowchart showing a method for subscription adaptation based on network utilization.

DETAILED DESCRIPTION

Figure 1:
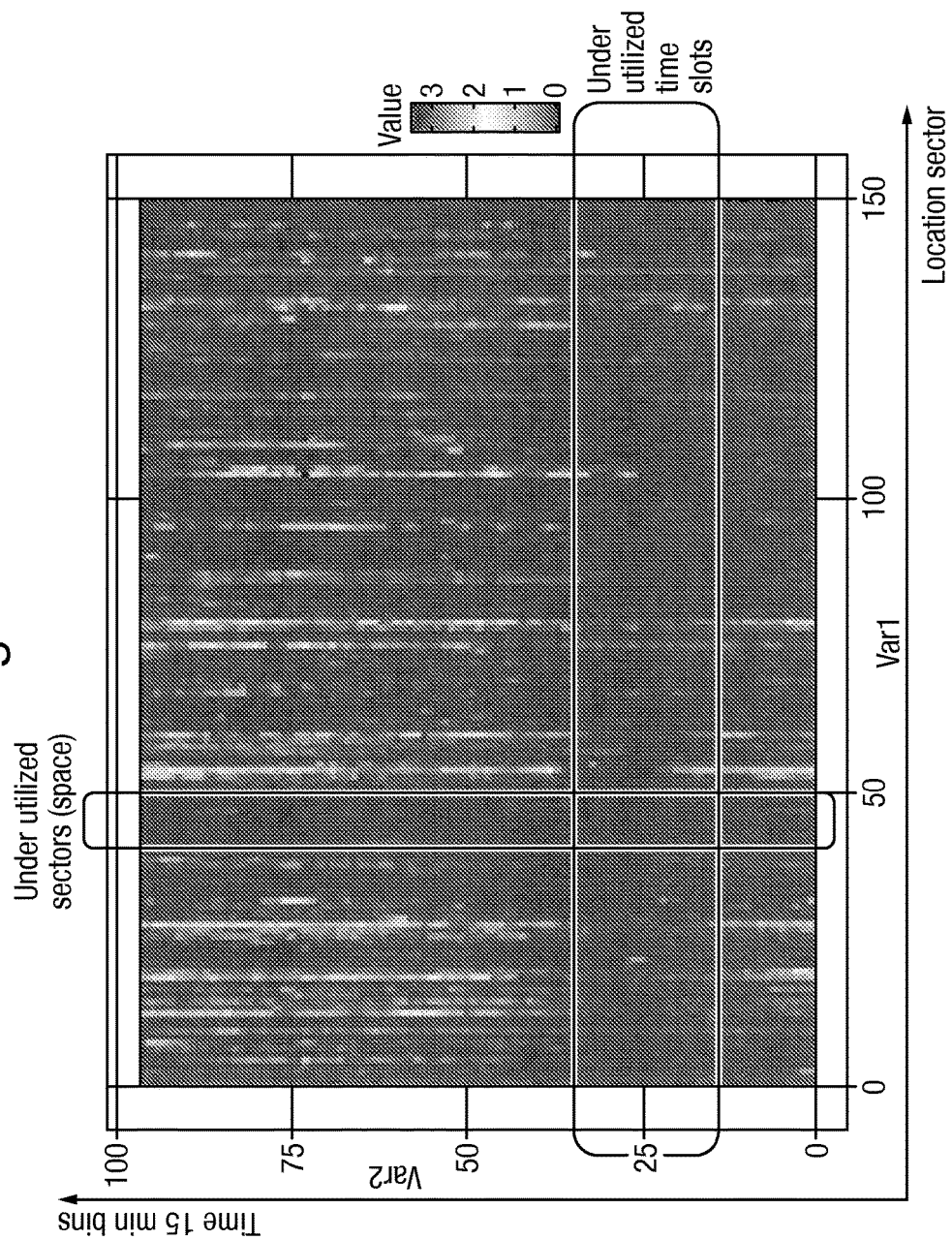
FIG. 1 is a heat diagram showing that some areas in a network are underutilized during certain periods.

Embodiments of the described solutions relate generally to systems and methods that perform subscriber profiling, e.g. segmentation, based on the cost for example in terms of network utilization each subscriber generates to the network and based on usage behavior analytics in terms of data volume, location and periods of the day. Embodiments of the described solutions further relates generally to methods performing mobile broadband subscription adaptation based on the profile of a subscriber in terms of generated cost and usage behavior predictability.

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in a non-transitory computer readable medium and so executed by a computer or processor, whether or not such computer or processor is explicitly shown.

The functions of the various elements including functional blocks, including but not limited to those labeled or described as "computer", "processor" or "controller" may be provided through the use of hardware such as circuit hardware and/or hardware capable of executing software in the form of coded instructions stored on computer readable medium. Thus, such functions and illustrated functional blocks are to be understood as being hardware-implemented and/or computer-implemented, (e.g., machine-implemented).

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions.

In terms of computer implementation, a computer is generally understood to comprise one or more processors, or one or more controllers, and the terms computer and processor and controller may be employed interchangeably herein. When provided by a computer, processor, or controller, the functions may be provided by a single dedicated computer, processor, or controller, by a single shared computer, processor, or controller, or by a plurality of individual computers, processors, or controllers, some of which may be shared or distributed. Moreover, use of the term "processor" or "controller" shall also be construed to refer to other hardware capable of performing such functions and/or executing software, such as the example hardware recited above.

The technology may be used in any type of cellular radio communications (e.g., GSM, CDMA, 3G, 4G, etc). For ease of description, the term user equipment (UE) encompasses any kind of radio communications terminal/device, mobile station (MS), PDAs, cell phones, laptops, etc.

Referring now more particularly to the drawings in which like reference numerals indicate like parts throughout the several views.

FIG. 1 is a heat diagram showing that some areas in a network are underutilized during certain periods.

There are often locations of the network which are underutilized during certain periods i.e. traffic demand lower than its actual capacity. This underutilization represents a waste in terms of Capital Expenditure (CAPEX) and Operational Expenditure (OPEX) for mobile operators that had to deploy and manage network nodes (e.g. radio base stations) in areas of low traffic demand e.g. for coverage purposes or due to regulatory issues.

An example of inefficiency is shown in FIG. 1, taken from this study where the resource utilization is measured over 15 minute's time slots (y axis) for each cell sector (x axis) in a heat map. One can clearly see that there are space/time slots in the network which are underutilized.

Figure 2:
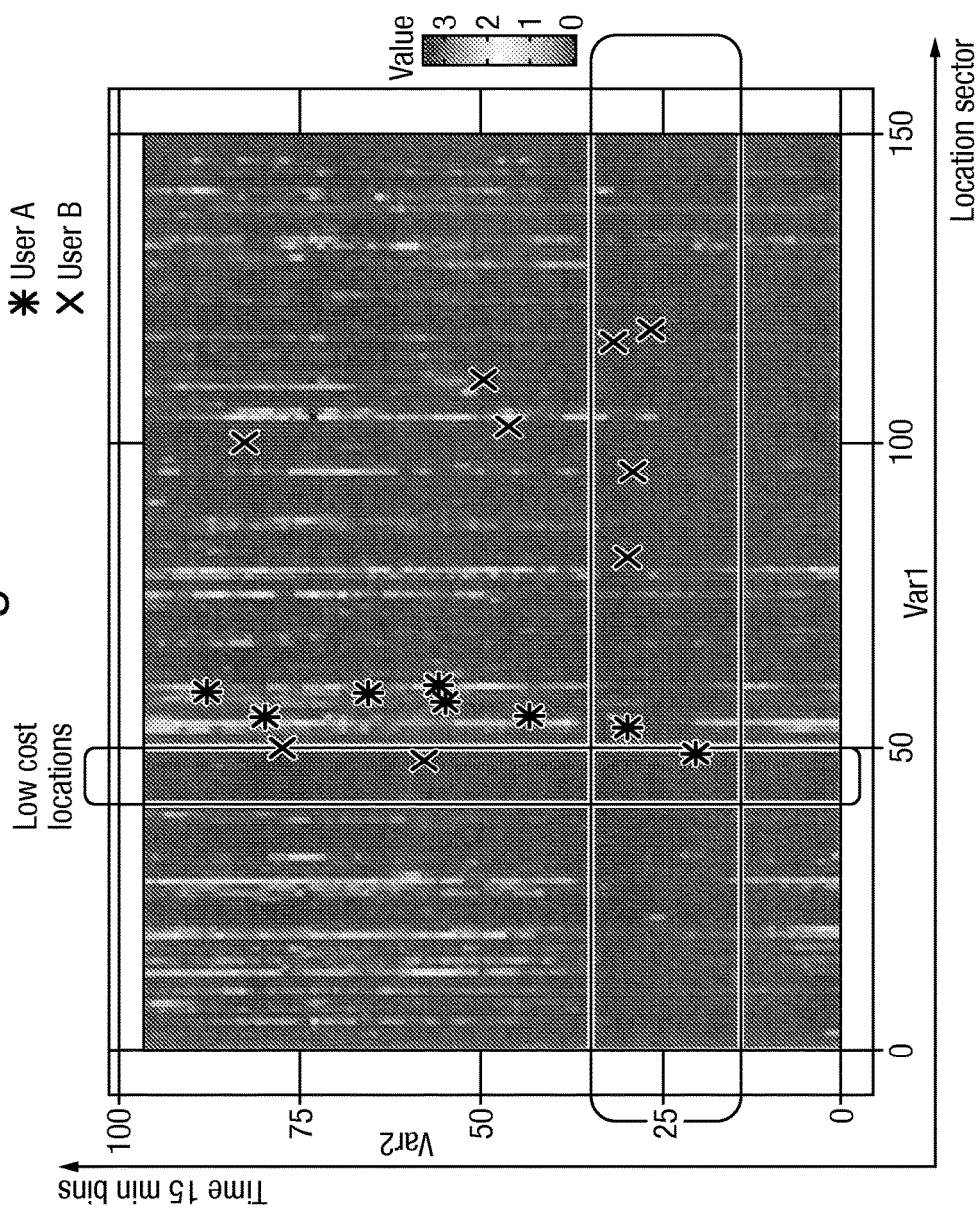
FIG. 2 is a heat diagram showing that different subscribers generate different cost to the network.

FIG. 2 is a heat diagram showing that different subscribers generate different cost to the network.

It has also been found that different users generate different amount of traffic in different network locations during different periods of the day. In other words, different users generate data traffic in different space/time slots. Some users may generate more in space/time slots of high demand and other in low space/time slot demands. Assuming that the network cost (in terms of OPEX/CAPEX) in a given location during a given time slot is a function of the resource utilization, one conclusion from the study is that different subscribers generate a different cost to the network considering the locations and the period of the day they generate traffic to the network. I.e. traffic generated in high demand slots are associated with a higher cost.

In FIG. 2 we can see an X every time a user A or B consumed data in a given space-time slot. User A consumes mostly in areas/periods with high load and user B in areas/periods with low load.

Therefore, conclusions are summarized as follows:

(a). Network resource utilization is inefficient when some location/time-slots have very high demand and others have very low demand;

(b). User consumption over these space/time-slots is not uniform; Some users consume more in space/time-slots with high traffic demand and other users consume in space/time-slots with low traffic demand. Thus, different subscribers impose a different cost to the network.

A problem that has been found, after analyzing the above conclusions, is that despite the fact that subscribers generate a different cost to the network, there is no differentiation in their pricing strategy set by operators. Because the network is underutilized, operators are missing an opportunity to use their available resources in order to improve customer satisfaction, reduce churn or personalize subscription or discounts. In other terms, a problem is the lack of a coupling between pricing/discount strategy and subscriber generated cost.

Figure 3:
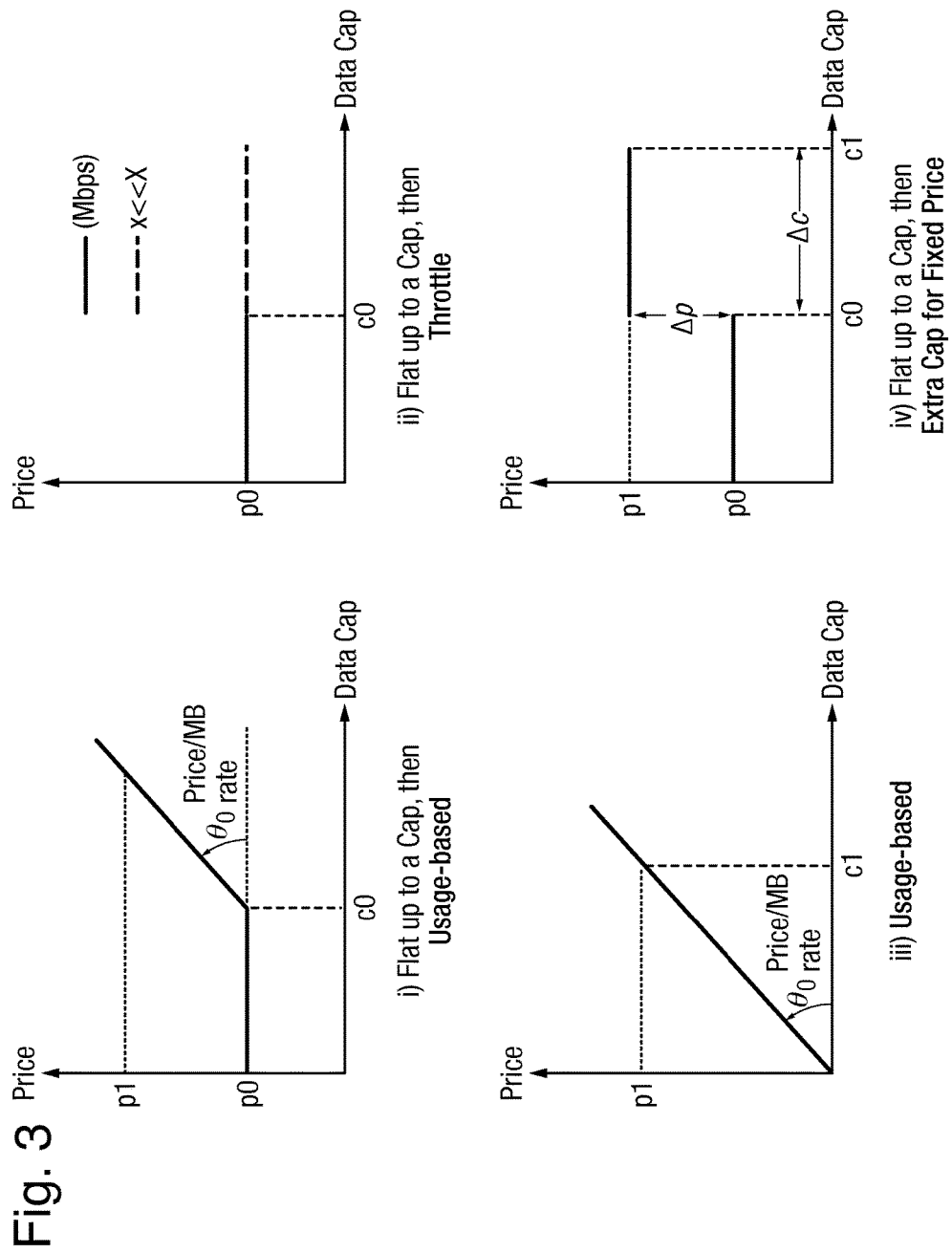
FIG. 3 shows graphical representations of various popular pricing strategies for mobile broadband data plans.

FIG. 3 shows a graphical representation of the most popular pricing strategies for mobile broadband data plans.

In the following, some popular pricing strategies are presented.

In fixed flat-rate, a fixed monthly fee is charged despite the data usage (amount of data consumed) or the time spent in the network. The most popular variants are:

i) Flat-Rate up to a Cap, then usage-based: a maximum data usage limit is given for a flat price. If this data Cap is exceeded an additional cost proportional to the usage is charged. Different plans may have different Price/Mega Byte (MB) rate after the limit is reached.

ii) Flat up to a Cap, then throttle: If the data usage limit is exceeded, the data rates are throttled to a very low value.

iii) Usage-based price: In usage-based pricing, a user is charged in proportion to the data usage. Different plans may have different Price/MB rate after the limit is reached.

iv) Flat up to a Cap, then extra Cap for a fixed price: If the data usage limit is exceeded, an extra data Cap is offered for a fixed price.

Each variant has a set of parameters that are used to differentiate the subscriptions. For example, in "Flat up to a Cap, then usage-based" the parameter p0 is the initial price up to the data cap c0 (e.g. measured in MB). The parameter $\theta_0$ is defined as the price/MB rate after the data cap is consumed. The final price will be p1=p0 if the user consumed less than c0 or $p1=p0+\theta_0*c$ where c=c0+extra cap consumed.

In the case of "Flat up to a Cap, then throttle" the parameters are c0 (data cap) and p0 (price). Herein, the user always pays the same price. In the case of "Usage-based" the final price is linearly proportional to the consumed cap c1, i.e. $p1=c1*\theta_0$.

In the case of "Flat up to a Cap, then Extra Cap for Fixed Price" p0 is the price before the cap c0 is achieved. Then, after c0, the user can buy an extra cap of $\Delta c = c_0 - c_1$ by an extra price of $\Delta p = p_0 - p_1$.

With shared data plans, users share the data usage limit across multiple devices at a premium for each additional device.

(Static) Time of Day (TOD) pricing schemes are designed to charge peak hours and off-peak hours differently to disperse user demand more uniformly and over a longer time period. Previous works in this area considered reservation-based pricing that divided a day into peak and off-peak periods and incorporated the time elasticity of user demand. They showed that peak load pricing reduces peak utilization and the blocking probability of all traffic classes, and increases revenue by inducing more even distribution of demand over peak and off-peak periods.

With Cumulus pricing (static) a service provider initially offers a flat-rate contract to the user for a specified period based on the user's estimate of resource requirements. During this time the provider monitors the user's actual usage and provides periodic feedback to the user (by reporting on "cumulus points") to indicate whether the user has exceeded the specified resource requirements. Once the cumulative score of a user exceeds the predefined threshold, the contract is renegotiated.

With Dynamic Congestion price based on time, space, load (dynamic) the network announces prices based on current congestion level and the user response to these prices get fed back into the control loop to compute new prices.

A similar congestion pricing for voice calls called "Location based tariff" offers discounts to its customer's calls based on the network traffic condition in the location from where they make the call; these discounts are visible to the customers on their handset.

Since this solution proposes a way to compute the network cost based on network resource utilization i.e. based on the network load and capacity, it is relevant to describe the existing measurements for network resource utilization in 3GPP networks. Herein, network utilization, load and capacity are considered similar measures.

In the case of a Long Time Evolution (LTE) system, a standardized load information element (IE) called Composite Available Capacity (CAC) may be used to compute Network Cost Matrix (NCM) entries. The CAC is specified in 3GPP TS 36.423 v12.0.0 as 'the Composite Available Capacity IE indicates the overall available resource level in the cell in either Downlink or Uplink'. Each cell should compute the CAC based on the best knowledge of its own traffic including user QoS profiles and radio conditions. It should be noted that the calculation of the CAC may be based not only on radio resource load but also on hardware load and/or transport network load. A smaller CAC of a cell indicates a higher cell load. It's being discussed in 3GPP that if the CAC may be defined for a UMTS network as well.

Other metrics for resource utilization are the Pair Resource Block (PRB) utilization in LTE, code and power utilization in UMTS, hardware/backhaul/license utilization in both systems and number of active users including their profiles. The metrics can also be combined e.g. total available PRB/code/power/hardware.

There are different ways to obtain the load measurements. One typical way is via the Operations, Administration and Management (OAM) system, e.g. an Operations Support System (OSS). In both LTE and UMTS systems, counters and events have been defined to monitor cell load. Examples include capacity/license/backhaul capacity.

In general, one way the mobile operator can cope with the difference between subscribers in terms of their potential traffic demand is by offering different Mobile Broad Band (MBB) data plans. Traditionally, Mobile Network Operators (MNO) have only used simple flat-rate unlimited data plans to their customers. But today, with the popularity of mobile devices and exponential growth of apps, MNOs are gradually moving towards more sophisticated pricing schemes, including dynamic pricing. Despite its success in emerging markets, there are several unique challenges with the dynamic pricing of mobile data, including complex system requirements and social adoption. For this reason, static MBB offers seem to be a good alternative for most of MNOs due to its simplicity in terms of system requirements and its easier market adoption.

Most of the existing static MBB subscriptions offered today are quite limited, being either fixed flat-rate or usage-based trying to target different groups of people. In the case of fixed flat-rate plans include e.g. a fixed amount of data to be consumed (data cap or data bucket) for a fixed price. The subscriber can usually choose the volume of the data bucket (also called data Cap), e.g., 0.5 GB, 3 GB, or 6 GB, and pay accordingly to that. Market adoption is easy for fixed flat-rate, but it is not sustainable since MNOs cannot couple pricing with data consumption. A different flavor to overcome this issue considers some sort of penalty when the user consumes more than the pre-defined bulk e.g. throttling. In the case of usage-based, despite the better coupling between price and network cost (or resource utilization) there are some challenges such as i) concerns about user adoption and demand loss and ii) increased complexity of billing and monitoring of the network performance, charges customers based on the level of congestion in the network.

A problem identified is that the existing pricing strategies on the market do not take into account the fact that different subscribers enforce very different costs to the mobile network, depending on when and where they use data services. This difference in subscriber network cost is currently not reflected in the way the operator handles the subscriptions or in what is offered to the different subscribers.

Considering the existing data plans, flat-rate is cheap to implement and operate, encourages user demand, and creates simple and predictable monthly fees for customers. However, it leads to inefficient resource utilization and market segmentation with low usage customers typically subsidizing the heavy users. Another clear disadvantage is the fact that revenues depend on the median user but peak load costs are driven by the heavy users, thus creating a price-cost mismatching.

Usage-based pricing provides a better coupling between price and network cost (or resource utilization). However there are some challenges such as i) concerns about user adoption and demand loss, ii) increased complexity in billing and monitoring of the network performance.

Among the other strategies, the ones which give some flavor of flexibility, as we want to enable with the method described in this solution are: i) Time of day (TOD) pricing (static), ii) Cumulus pricing (static) and iii) dynamic congestion based on time, space and space/time. In the following the limitation of these strategies are pointed out.

The main problem of time of the day (TOD) strategy is the lack of personalization. The most typical case for this strategy is a two period plan but other variants exist. In some examples, users have unlimited web access during "happy hours" that corresponds to the user's morning commute (8-9 am), lunch break (12-1 pm), late afternoon break (4-5 pm), or late night (10-11 pm). In this case, all the users would benefit from the plan. No personalization and no criteria to select the best suitable users to the plan.

Cumulus pricing strategy has some flavor of subscriber personalization, but the criteria used to personalize the subscription seem to be very limited, only based on the amount of consumed data. Some MNOs have been using this strategy allows customers joining any of the monthly pay contracts to have unlimited data access for the first three months. The data usage report is then fed back to the user to negotiate whether the chosen plan is appropriate for them. The user will then have a choice of either continuing with existing plan and possibly incur overages or switch to an alternative plan.

In addition to the limitation related to the different MBB subscriptions, the discounts strategies that operators apply are quite fixed and typically not personalized. Operators may offer pricing discounts based on location or period of the day in the best case in a dynamic fashion. These limitations may be mitigated by solutions described herein.

Another aspect in this lack of personalization could be observed when a user tries to cancel its subscription e.g. by calling the customer care service. In some scenarios, the operator may offer a better plan or discounts, but these are fixed or in the best case, dependent of the subscription type the customer may have, but not based on the cost the customer generates to the network and the fact the network may be underutilized. Also such limitations may be mitigated by the here described solutions.

Figure 4:
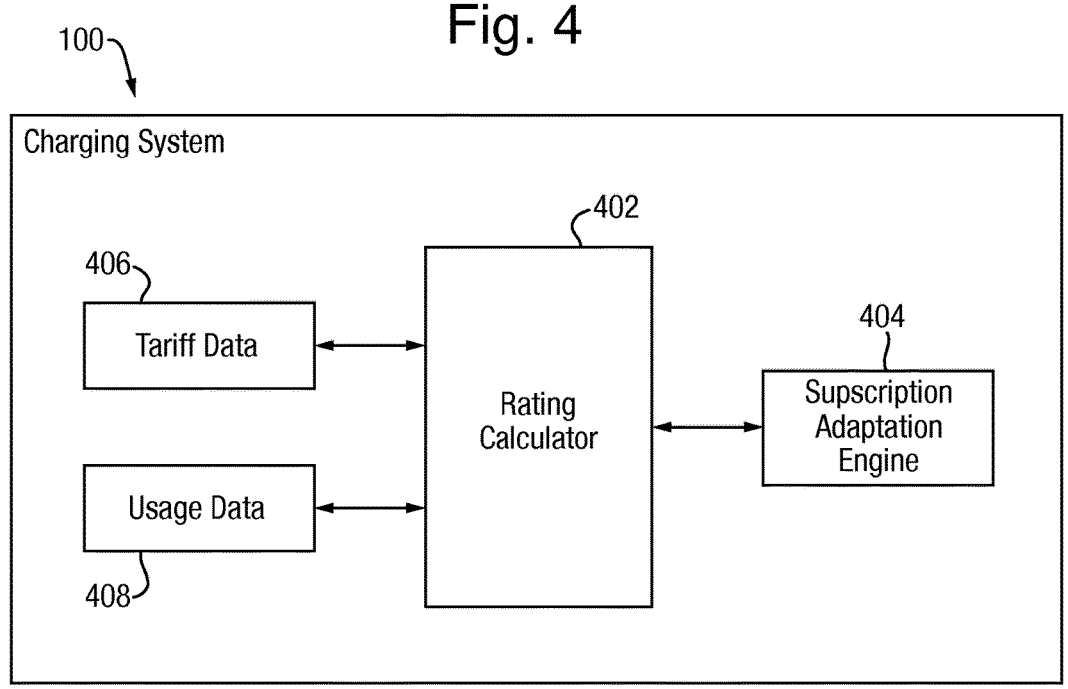
FIG. 4 is a block diagram of a non-limiting charging system according to certain example embodiments.

FIG. 4 is a block diagram of a non-limiting charging system according to certain example embodiments. A charging system 400 such as an Online Charging System (OCS) may include a rating calculator 402 that is used to calculate different rating related values. The rating calculator may accept tariff data 406 (e.g., price per unit, such as one dollar per megabyte) and usage data 408 (e.g., consumption data, such as a user has consumed five megabytes of data) as input. It will be appreciated that other types of data may be used by the rating calculator 402. Other types of data may include, for example, the current location of the UE connected to an associated mobile network, usage data on other UE's related to a primary UE (e.g., as part of a family plan), the time of day, the duration of a given call or calls, or other data related to a subscriber's (other than the subscriber's UE) interaction with a service provider or mobile communications network.

The rating calculator may further accept subscriber segmentation data received from a Subscription Adaption Engine (SAE) 404. The SAE may perform subscriber profiling such as subscriber segmentation based on the cost in terms of network utilization each subscriber generates to the network and based on usage behavior analytics in terms of data volume, location and periods of the day used for subscriber predictability. The SAE may further perform mobile broadband subscription adaptation based on the segment of a subscriber in terms of generated cost and usage behavior predictability. It should be noted that the SAE may be integrated with a charging system such as an Online Charging System as standardized by the 3GPP. The SAE may also be a standalone node. The SAE may relate to consuming communications devices such as a mobile phone, personal digital assistant, smart phone, tablet pc or the like—but may also relate to a machine-to-machine communication device.

A method performed by the SAE may comprise:

(i) In a first step computing a a network utilization metric such as a Network Cost Matrix (NCM) with dimensions L and T where L is the number of network locations (e.g. cell sectors, antenna beams, etc) and T is the number of time slots within a given time window (e.g. time window=24 hours divided in 15 minutes time slots would lead to T=24*60/15=96 time slots). Each (l,t)-th element is the cost generated at the l-th location during the t-th time slot, referred to as a resource bin. As previously described, the network cost (in terms of OPEX/CAPEX) in a given location during a given time slot is a function of the resource utilization. Thus, different subscribers generate a different cost to the network considering the locations and the period of the day they generate traffic to the network. I.e. traffic generated in high demand slots is associated with a higher cost.

(ii) In a second step computing a subscriber utilization metric for the cost each subscriber generates to the network by mapping the MBB activity of each subscriber to the NCM within the same time window.

(iii) In a third step computing a subscriber predictability metric for the cost predictability of each subscriber based on their MBB consumption behavior i.e. data volume, location and time slots they consume.

(iv) In a fourth step performing subscriber profiling in terms of subscriber's generated cost and subscriber's predictability. The profiling is done using the results of the previously computed analytics. Profiling may be done using a continuous function of the cost each subscriber generates and the cost predictability of each subscriber. The profiling may also include a associating the subscriber with a discrete set of subscription segments. In the case of subscription segments, the subscriber may belong to one of the following groups: Unpredictable users (in terms of generated cost); Predictable high-cost (possibly further grouped into high-consumption users and/or low-consumption users); Predictable low-cost (possibly further grouped into high-consumption users and/or low-consumption users). In the following the subscriber profiling will be described based on subscriber segmentation, and charging based on a determined subscriber segment.

(v) In a fifth step performing MBB subscription adaptation for predictable users per user depending on the segment each user belongs to which has been classified according to the previous step.

When the rating calculator 402 receives/retrieves tariff data 406, usage data 408, and consumer segmentation data, one or more calculations may be performed for rating a service. The charging system may operate in conjunction with, or a part of, of a mobile communications network.

Figure 5:
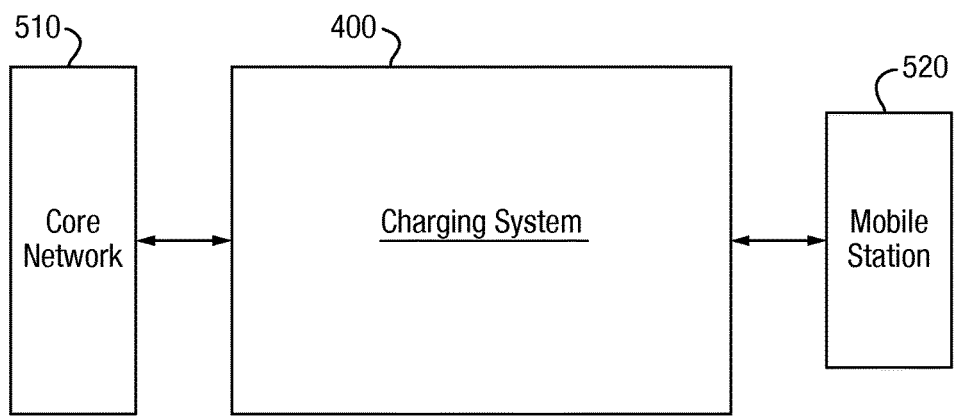
FIG. 5 is a block diagram showing a non-limiting charging system in an example mobile communications network.

FIG. 5 is a block diagram showing a non-limiting charging system 400 in an example mobile communications network wherein the charging system is operably connected to a core network 510 as well as a mobile station 520. It is advantageous that mobile operator may provide as good customer experience as possible to the subscribers, since this will reduce churn as well as costly customer support calls from unhappy subscribers. This needs to be achieved while minimizing the total cost of the network. The presented solution provides an automatic way for the operator to provide more personalized discounts, subscriptions to subscribers in a way so that their customer satisfaction is increased, while maintaining the same cost level of the network.

The proposed solution also enables a congestion-based pricing strategy but using subscriber analytics on historical data instead of putting new requirements in the network in terms of real-time signaling and real-time monitoring to enable dynamic pricing. The other aspect is that market adoption can be made easier.

Figure 6:
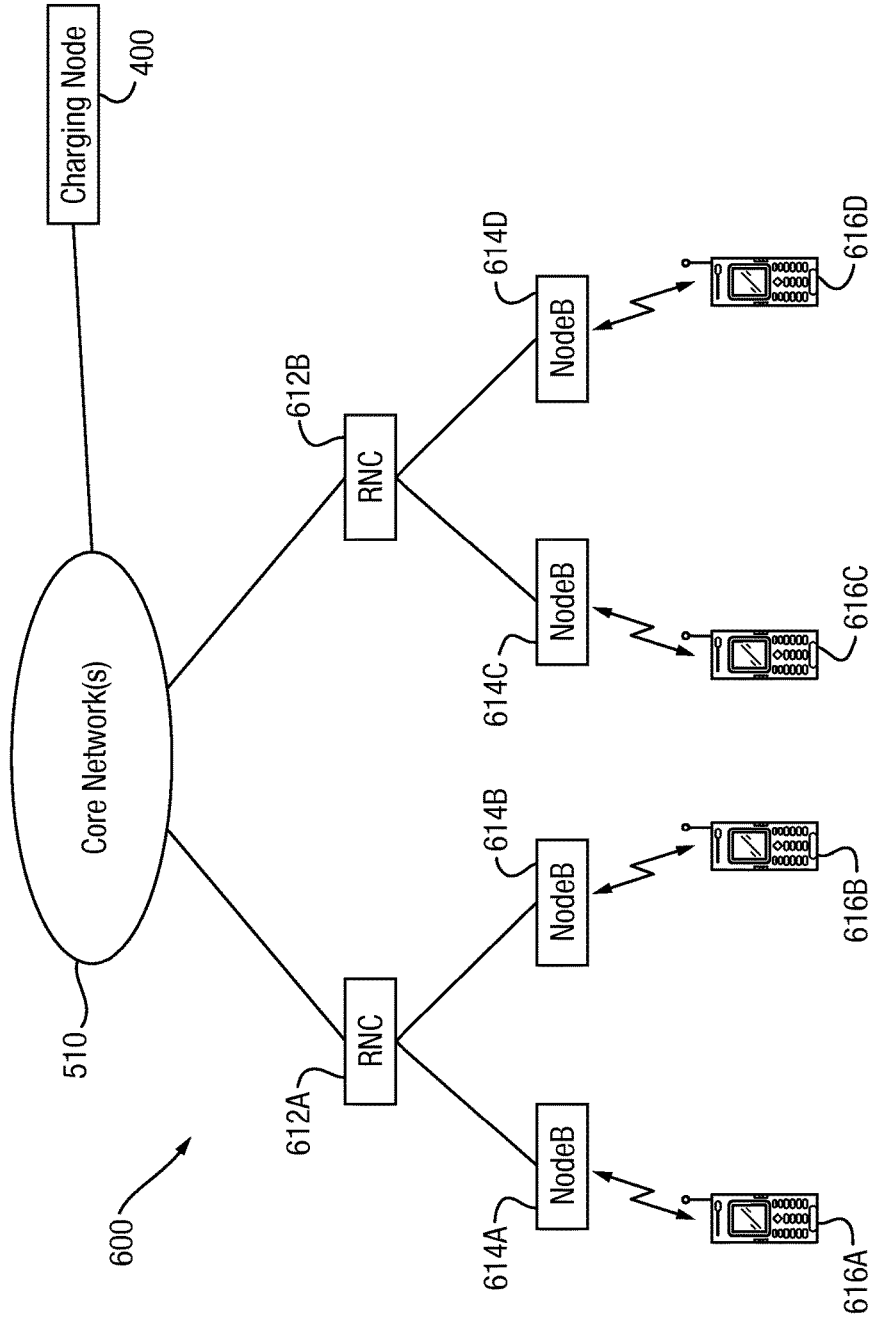
FIG. 6 is a non-limiting diagram of a network operator servicing respective subscribes with an exemplary charging node.

FIG. 6 is a non-limiting diagram of a network operator servicing respective subscribes with an exemplary charging node. The infrastructure of a communications network 600 includes a core network 510 and a RAN (e.g., a UTRAN) that includes RNCs 612A and 612B and NodeBs 614A, 614B, 614C, and 614D.

Core network 510 provides various core functionalities for a communications network of a service provider. It will be appreciated that core network 510 may include numerous separate core networks that may interface with each other. The core network 510 may provide various services. Such services may include, for example: 1) an authentication capability to determine whether a UE requesting a service from the communication network is authorized to do so; 2) a call routing or switching functionality that directs and/or determines how calls are routed/switched within the communications network and/or other networks; 3) communication between nodes of the core network 510 and/or RAN layer; and 4) statistic gathering capability such as, for example, the number of calls being handled, the number of subscribers attached to the network, the type of services being used, or the like.

Base stations 614A, 614B, 614C, and 614D (e.g., NodeBs) facilitate mobile radio communications for a network operator of core network 510 to UEs 616A, 616B, 616C, and 616D that are subscribed to the network operator's mobile network. The individual UEs may obtain service through a base station that facilitates mobile communications service with a given geographical area. Thus, UE 616A obtains service (e.g., over allocated radio resources through techniques such as TDM or FDM) through base station 614A; UE 616B obtains service through base station 614B; UE 616C obtains service through base station 614C; UE 616D obtains service through base station 614D.

It will be appreciated that the example network architecture of FIG. 6 is shown only be way of example. Other types of infrastructure for network implementations may be used in accordance with certain example embodiments. For example, RNC nodes 612A/B may be removed and the NodeBs may communicate directly with the core network 510. Certain example embodiments may be implemented in conjunction with GSM, CDMA, 3G, 4G, IP based systems, etc.

In certain example embodiments, the core network 510 may communicate with a charging node 400 such as an OCS. In certain example embodiments, the charging node may be a node within the core network.

Figure 7:
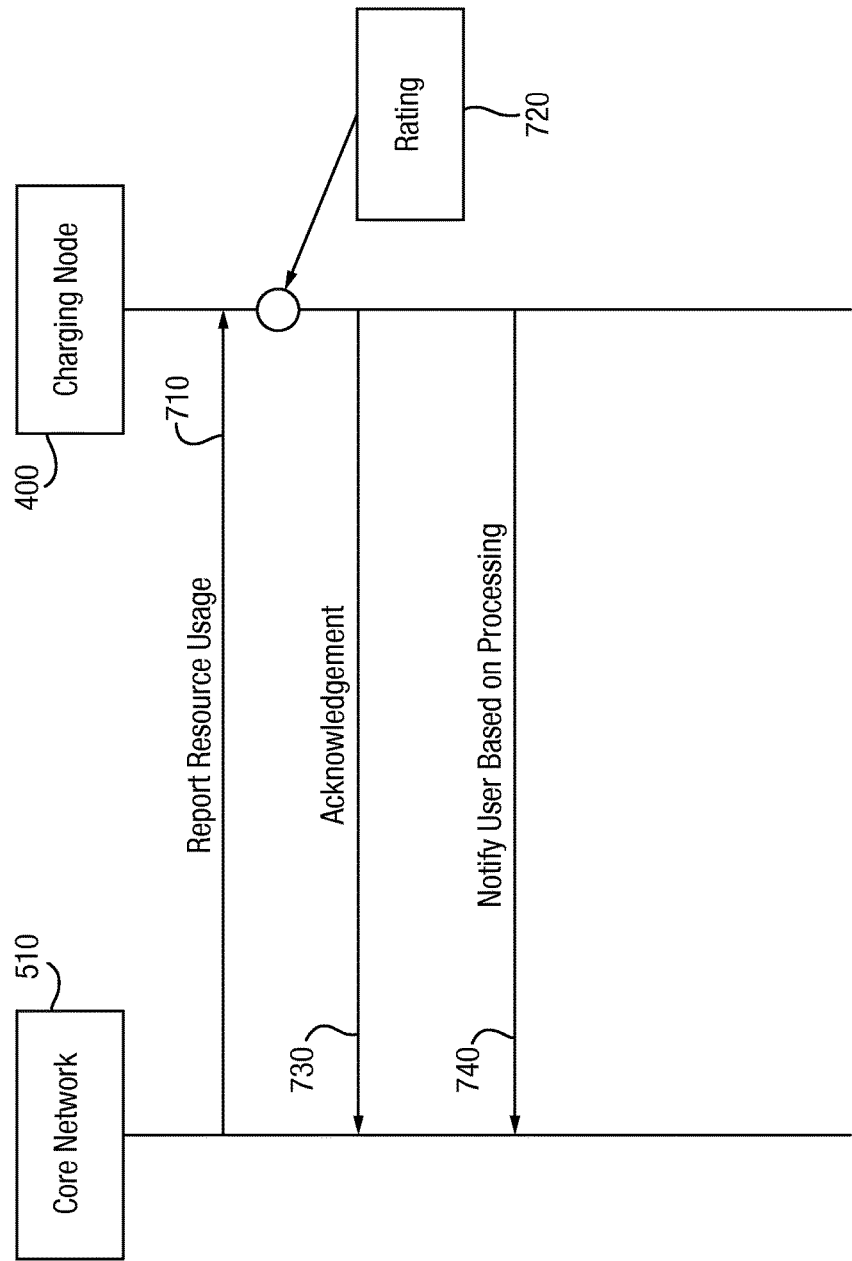
FIG. 7 is a signal diagram illustrating exemplary signals between a core network and a charging system.

FIG. 7 is a signal diagram illustrating exemplary signals between a core network and a charging system/charging node. The core network 510 may communicate with the charging node 400 by sending a report on resource usage in step 710. The report on resource usage may be related to the resources that have been reserved for a particular UE, user account, or the like. The report resource usage signal may be triggered by the consumption of the reserved resources by the UE. Alternatively, a reservation of resources may be tied to a specific period of time (e.g., a reservation may have a time-to-live value associated with it). Thus, when the period of time expires, the report resource usage command may be triggered. Other types of triggers may be implemented, for example, the report resource usage may be triggered at regular intervals that are not specifically tied to the expiration of a reservation. In any event, resources usage may be reported to the charging node 400. Based on this usage data, the charging node may perform rating in step 720 based on consumer segmentation. In addition, after receiving the resource usage data the charging node 400 may acknowledge the receipt of the report to the core network 208 in step 730.

Consumer segmentation performed as basis for the rating in step 730 may be performed in conjunction with the rating, or may be performed independently of the rating, for example before the rating. The user may be notified about the rating processing in step 740.

Figure 8:
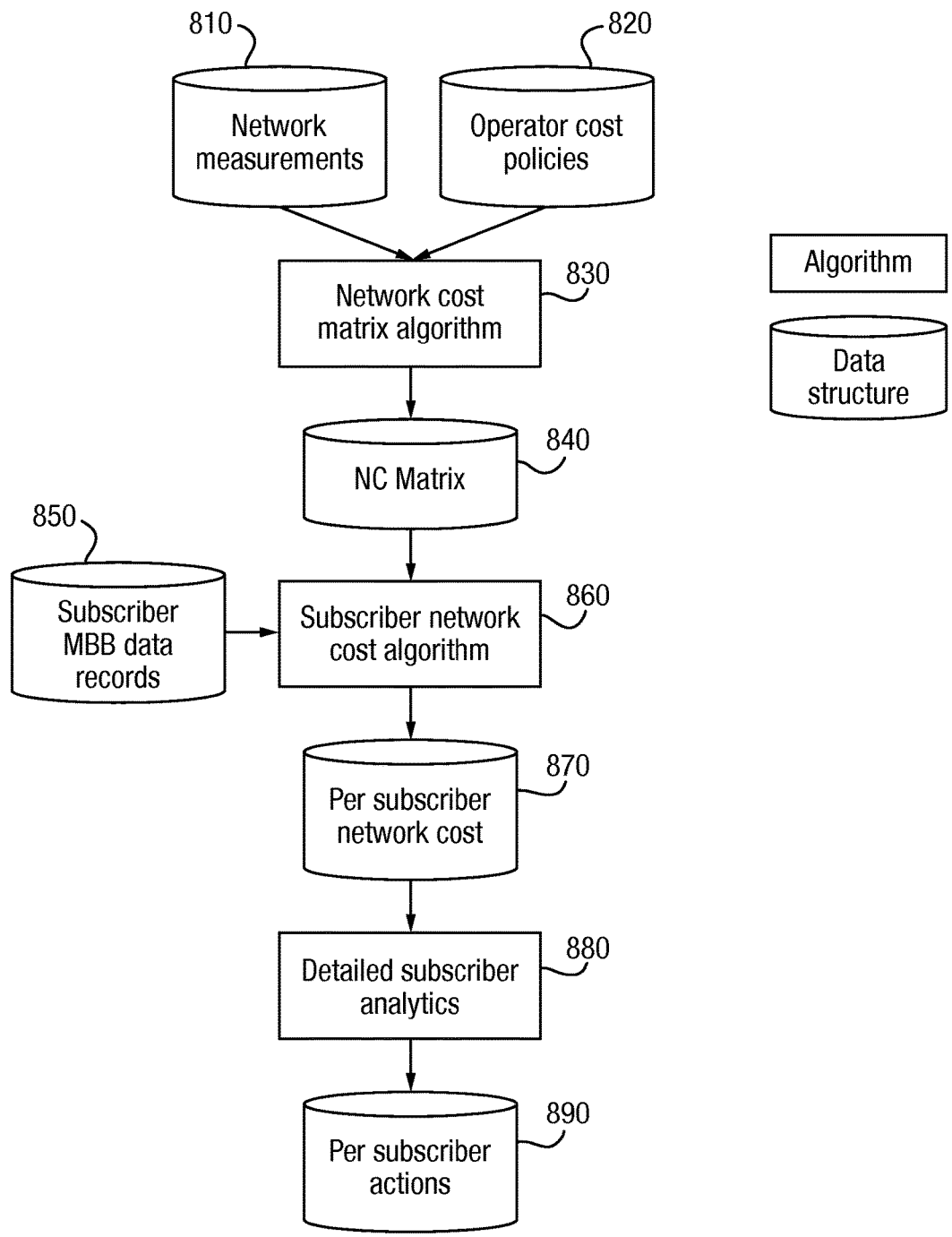
FIG. 8 is a flowchart including system components, algorithms and data structures.

FIG. 8 is a flowchart including system components, algorithms and data structures.

To compute the network cost matrix (NCM), the network locations are divided into L space slots and a pre-defined time window divided in T time slots. Then, these dimensions are combined in LT space-time bins. The details about how the NCM is computed per space-time bin depends both on the system in question 810, and the operator cost policies 820, applied as input to the computation 830.

In a first embodiment, the (l,t)-th element of the NCM 840 is defined as the sum of the load/capacity/resource utilization at the l-th location during the whole t-th time slot where the load/capacity/resource utilization is one of the following metrics or any combination of these, namely, the Composite Available Capacity in LTE, the Pair Resource Block (PRB) utilization in LTE, the code and power utilization in UMTS, hardware/backhaul/license utilization in both systems and number of active users including their profiles in both systems.

The NCM computation may be adjusted according to different operator policies. In one example, a certain amount of capacity can reserved in an area for a certain period, and then the NCM may be modified to reflect the policy by increasing the cost for that location and time.

The NCM may also be calculated for each carrier/Radio Access Technologies (RAT) leading to multiple matrices. This is useful be used in the case of a network consisting of multiple carriers and/or multiple radio access technologies (RAT), e.g. LTE, UMTS, GSM and Wi-Fi.

One NCM entry value may also be obtained by integrating information from all carriers/RATs. In this case the 'location' dimension of the NCM is defined by geographical areas instead of serving cells. This may be useful in the case of one specific geographically area being served by overlapping carriers/RATs, In a second embodiment, the NCM reflects the network cost related to potential energy saving. In this case, the (l,t)-th element is inversely proportional to the number of active users at the l-th location during the t-th time-slot. Few users lead a higher cost. Thus, it is apparent that the notion of cost, or resource utilization, is depending on the circumstances. Low resource utilization could be considered costly from the viewpoint of infrastructure energy efficiency and maintaining infrastructure and energy consumption for a low degree of usage—or it could be considered as not costly as more subscribers share the actual infrastructure and energy consumption.

In one possible solution, the subscriber cost to the network or Network Cost (Subscriber X) is computed by Equation 1 (Total network cost of subscriber X over some time interval), shown below:

$$NetworkCost(subscriberX) = \sum_{i=n}^{LT} NCM(l(i), t(i))$$

where NCM(t(i),l(i)) is the (t,l)-th element of the NCM correlated with the MBB data usage of subscriber X at the same i-th space/time slot. Notice that in Equation 1, the space-time slots from the matrix are represented by i=1, 2, . . . , I indexed bins where I=LT. Thus, only the contribution of X to the total utilization given by the NCM is taken into account. In this formula only the presence of X in a bin is taken into account, and not the utilized data volume.

In another possible solution, the space-time location cost is weighted by the data volume consumed by the user. This is shown in Equation 2 (Weighted version of the total network cost of subscriber X over some time interval).

$$NetworkCost(subscriberX) = \sum_{i=n}^{LT} NCM(l(i), t(i))V(i)$$

where NCM(t(i),l(i)) is the (t,l)-th element of the NCM correlated with the MBB data usage of subscriber X at the same i-th space/time slot and V(i) is the data volume of subscriber X consumed at the i-th space/time slot. Notice that in Equation 2 the space-time slots from the matrix are represented by i=1, 2, . . . , I indexed bins where I=LT.

The MBB data usage information per subscriber 850 such as location, time, data volume, etc can be collected for example from an Ericsson LTE eNodeB pmEvents, from the Ericsson product CEA (Customer Experience Assurance) Extended Session Records (ESR), or from Charging Data Records (CDRs) from the Charging System.

The cost-predictability per subscriber is computed 860 and subscriber segmentation is performed 880. Segmentation may include grouping or associating subscribers into different categories.

For each subscriber, the system analyzes the distribution of the network cost and computes metrics 870 that reflects how predictable a subscriber is in terms of the cost that is generated in the different locations, periods and data volume. Based on these metrics, each subscriber is classified into different subscriber cost predictability groups 890.

In one possible example, the cost distribution is analyzed and two metrics are computed for this distribution, the average cost per bin, and the standard deviation of cost per bin. Based on these two values, each subscriber is classified into different subscriber cost predictability groups namely: Unpredictable users, Predictable high-cost users and Predictable low cost users. The combination of the values in relation to the thresholds would define the groups. Notice that there is no differentiation between unpredictable low and high cost users. Notice also that the binary levels high and low are just example, so more refined levels could be defined.

If both average cost per bin and standard deviation are higher than their thresholds, the user belongs to the group of Unpredictable users. If both average cost per bin and standard deviation are lower than their thresholds, the user belongs to the group of Predictable low-cost users. If the average cost per bin is higher than its threshold and the standard deviation is lower than its threshold, then the user belongs to the group of High-Cost Predictable users.

In the case equation 1 is used, i.e. considering presence but not used data volume, if X is often in high cost bins then X is considered as a high cost predictable user. In the opposite case, i.e. X is often in low cost bins, then X is considered a low cost predictable user.

Figure 9:
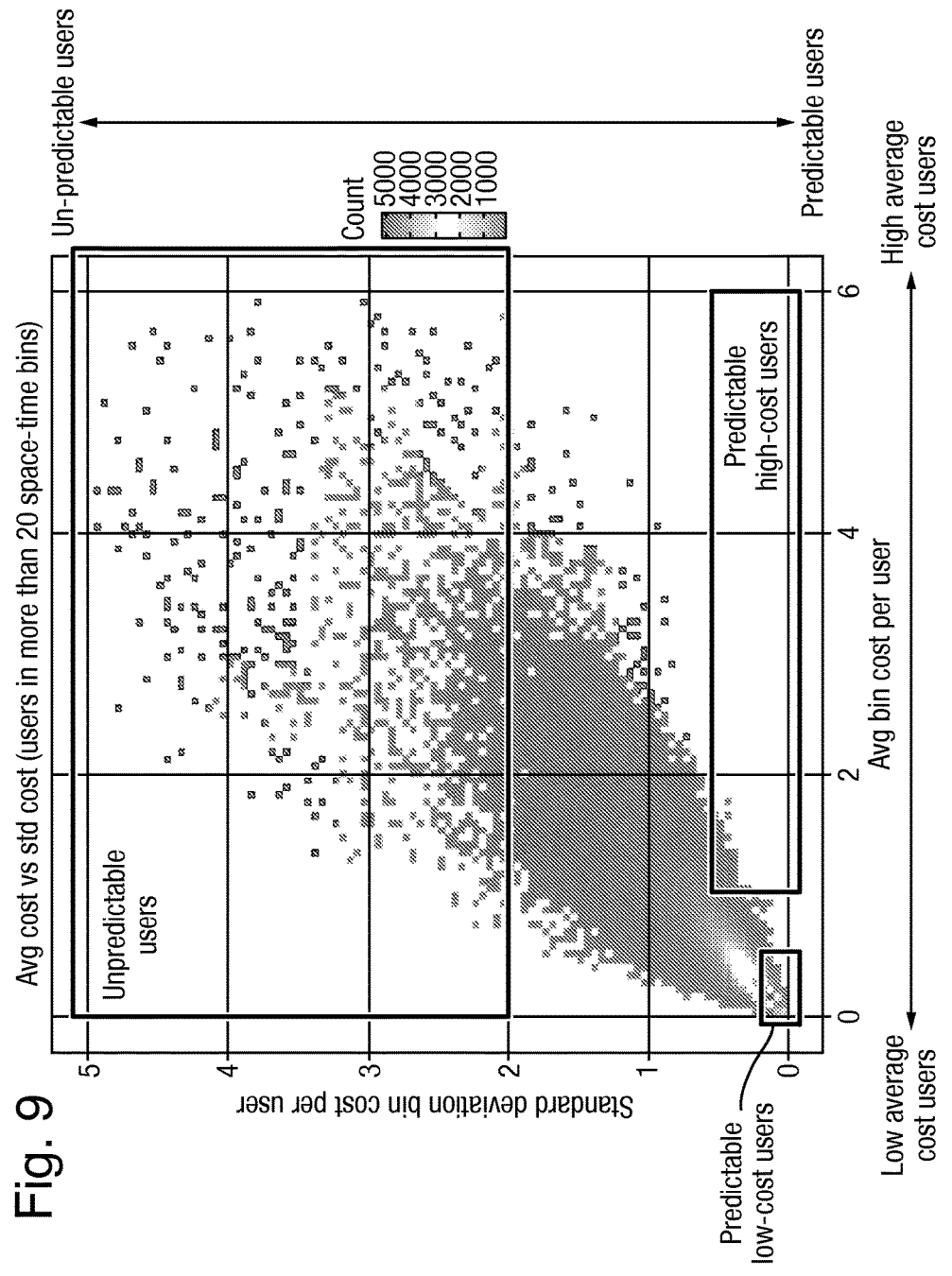
FIG. 9 is a heat map showing cost distribution per subscriber.

FIG. 9 is a heat map showing cost distribution per subscriber.

In FIG. 9, the x-axis shows average cost per user, y-axis shows standard deviation of cost per user. The color represents the number of users in each (x,y) position where lighter colour (white) refers to more dense positions than darker (black positions). FIG. 9 shows the number of subscribers in each (x,y) position, where x-axis is the average cost per subscriber, and y-axis is the standard deviation of cost per subscriber.

Figure 10:
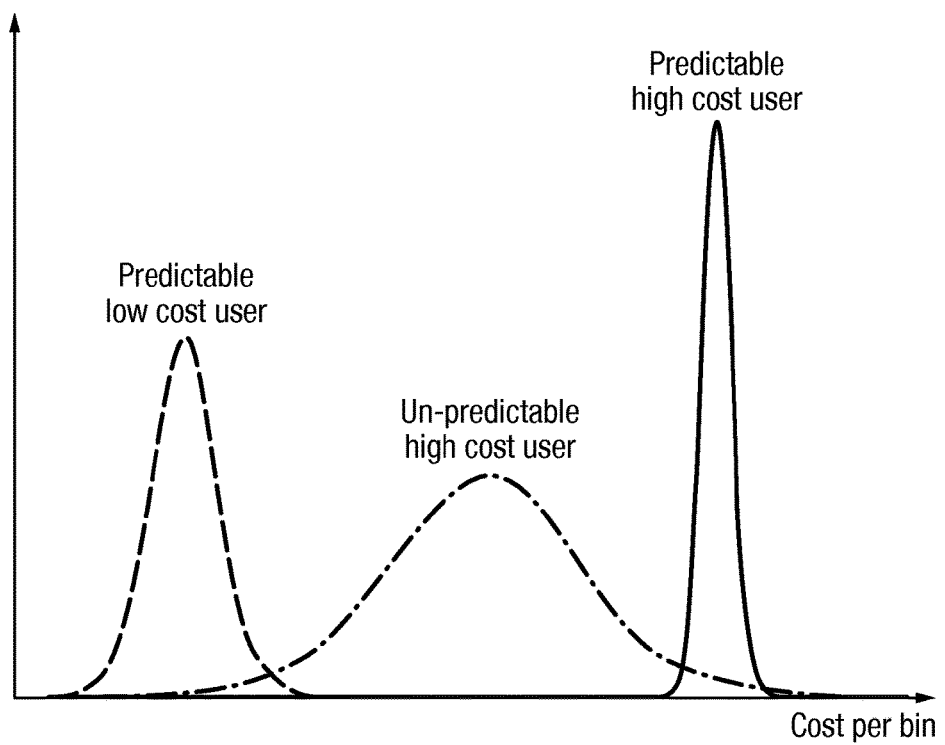
FIG. 10 is a diagram showing example data record cost distribution per subscriber.

FIG. 10 is a diagram showing example data record cost distribution per subscriber.

FIG. 10 shows examples of subscribers with very different and distinct cost distribution. The left subscriber is a very predictable low cost subscriber, the cost of all the subscriber data records is low and the spread is very low. The right subscriber is on the other hand a predictable high cost subscriber, and the middle subscriber is unpredictable, there is no clear pattern in terms of cost for the red subscriber.

The classification can be based on some thresholds per metric, either built into the system, adjustable by the user of the system (the operator) or found via some clustering algorithm.

In another possible example, the users within each of the segments Unpredictable users, Predictable high-cost users and Predictable low cost users can be further classified accordingly to the amount of data volume they consumed for example as High-consumption users and Low-consumption users. The volume thresholds in this case can be defined based on distribution of the data volume per user for the whole network or for each predictability group.

The consumption levels could be defined for each portion of the distribution. For example, one could say that if users are within the highest 5%-th percentile in the distribution they are high-consumption users and the rest are low-consumption users. Another way to categorize is to use the maximum data volume (also called data cap) in their subscription. In this case, users going further in their predefined volume could be defined as high-consumption users.

Note: It is worth mention that the binary levels (high and low) are just examples. In the solution, more levels for each of the criteria can be defined. For example, one could define three levels of consumption and/or cost such as high, moderate and low.

Figure 11:
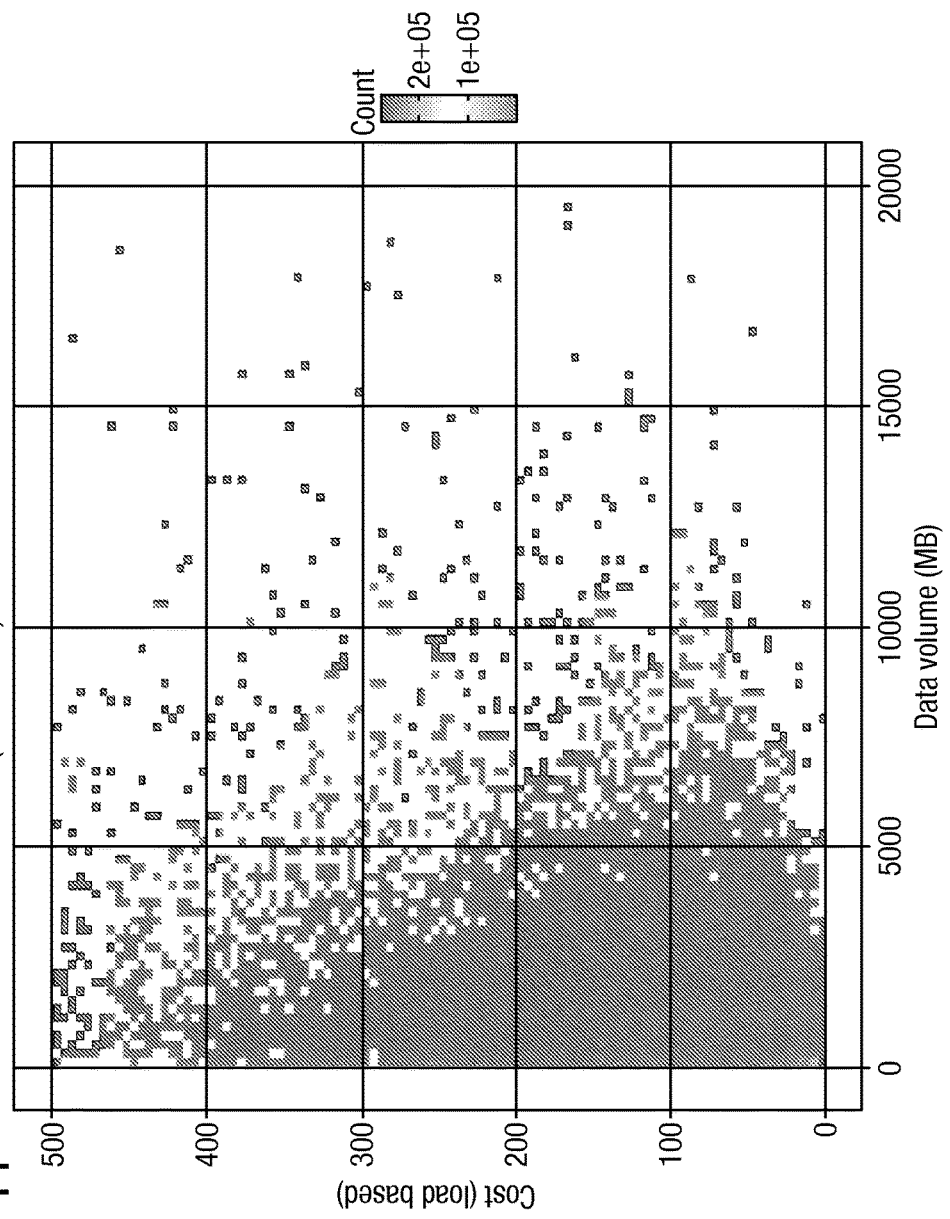
FIG. 11 is a heat diagram showing network cost per user vs. data volume per user.

FIG. 11 is a heat diagram showing network cost per user vs. data volume per user.

In FIG. 11 the cost is plotted in the y-axis and the data volume in the x-axis. It can be seen that there are high cost users that are using little data, and there are low cost users that are using a lot of data (high-cost hunger users).

MBB subscription adaptation may be performed based on subscriber segment. The adaptation of MBB subscription may advantageously be used for proactive discount, customer retention or subscription personalization strategies.

In a subscription personalization strategy, a subscriber may be charged proportionally to the cost the subscriber generates to the network and its cost predictability. For example, Predictable High-cost Users would pay more than Predictable Low-cost Users.

In a proactive discount strategy, a mobile operator may "give higher data Cap for a slightly higher price" to Predictable Low-Cost High-Consumption Users. By doing this, operator has the potential to increase its revenue and improve network utilization without extra CAPEX.

In a customer retention strategy, a mobile operator may "give more for the same price" to Predictable Low-Cost High-Consumption Users. By doing this, operator has the potential to reduce churn. The customer retention strategy can be applied when the user contacts (by calling, online self-service, etc) customer care service to cancel his subscription due to a high price because he is reaching his cap too often.

In a customer retention strategy, a mobile operator may "give the same for a lower price" to Predictable Low-Cost High-Consumption Users trying to cancel their subscriptions. By doing this, operator has the potential to reduce churn. The customer retention strategy can be applied when the user contacts (by calling, online self-service, etc) customer care service to cancel his subscription due to a high price despite its low consumption.

In the following, possible solutions are shown for the different adaptation that can be performed for different type of subscriptions and user segments.

Figure 12:
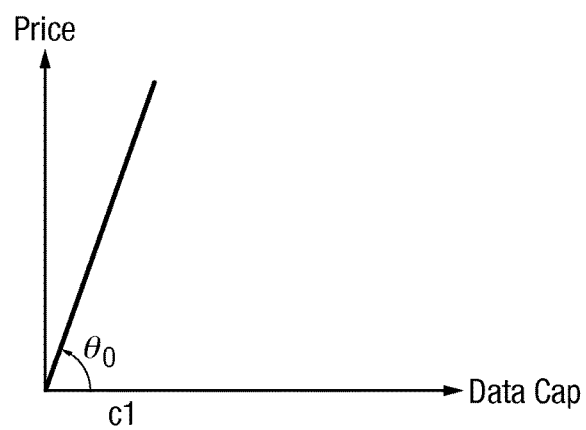
FIG. 12 shows subscription adaptation for Usage-Based mobile broadband pricing.

FIG. 12 shows subscription adaptation for Usage-Based mobile broadband pricing.

In a first possible solution, the price/MBB rate (parameter $\theta_0$) may be adapted as follows, lower for Predictable Low-Cost Users and higher for Predictable High-Cost Users (despite their consumption category) as a way to implement a personalized subscription strategy. The way the values are defined could be based on pre-defined rates in the operators' offers or via some continuous function that maps the parameter to the computed subscriber network cost.

The adaptation can also be performed as a way to implement proactive discount or customer retention by lowering the parameter for Predictable Low-Cost Users trying to cancel their subscriptions due to high price.

Figure 13:
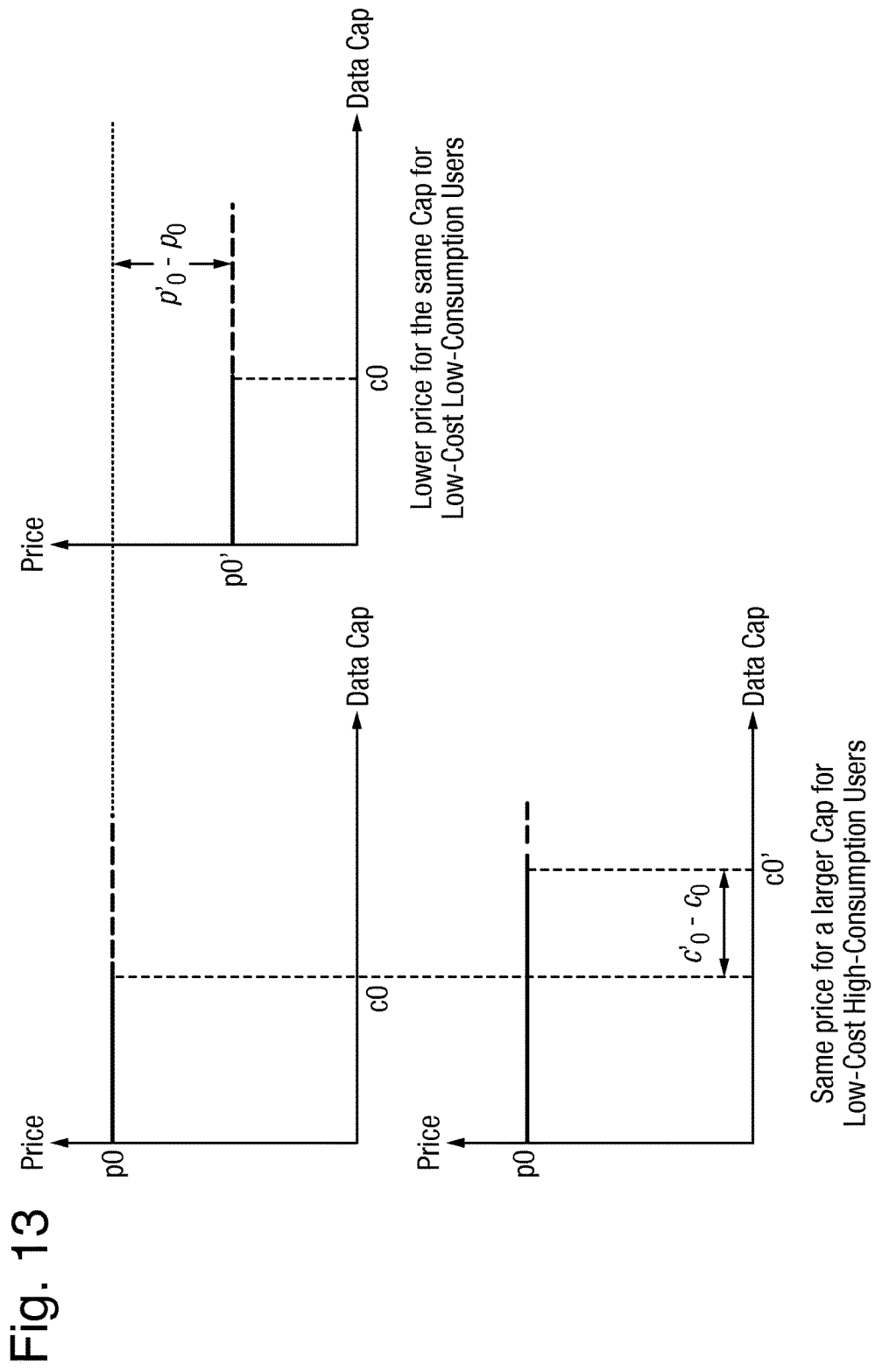
FIG. 13 shows adaptation of c0 and p0 for Flat-Rate to a Cap Then Throttle pricing.

FIG. 13 shows adaptation of c0 and p0 for Flat-Rate to a Cap Then Throttle pricing.

In a second possible solution, the Cap parameter c0 may adapted to implement a proactive discount strategy by giving a higher cap c0 to Predictable Low-Cost High-Consumption Users e.g. when their data plan is soon expiring or as a way to implement a customer retention strategy to reduce churn when they are trying to cancel their subscription because they reach the data cap too often.

In a third possible solution, the price p0 may be adapted to implement a customer retention strategy by lowering the price p0 for Predictable Low-Cost Low-Consumption Users e.g. when these users are trying to cancel their subscription because of the price.

Figure 14:
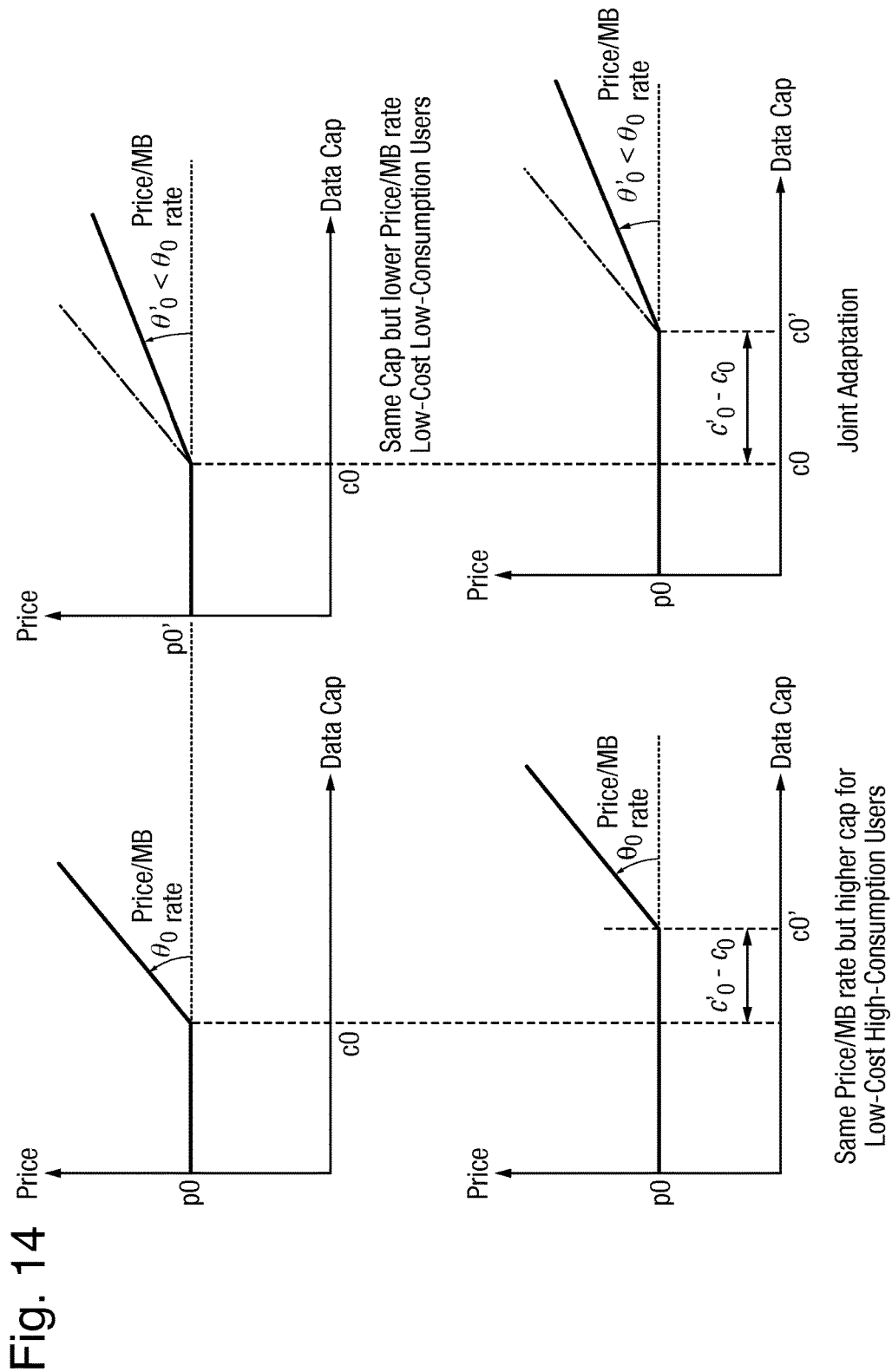
FIG. 14 shows adaptation of c0 and $\theta_0$ for Flat-Rate to a Cap, Then Usage-based pricing.

FIG. 14 shows adaptation of c0 and $\theta_0$ for Flat-Rate to a Cap, Then Usage-based pricing.

In a fourth possible solution, the Cap parameter c0 and the price/MB rate $\theta_0$ may be adapted to implement proactive discount by giving a lower $\theta_0$ for Predictable Low-Cost Low-Consumption Users or a higher c0 for Predictable Low-Cost High-Consumption Users e.g. when their data plan is almost expiring or as a way to implement a customer retention strategy to reduce churn when they are trying to cancel their subscription because they reach the data cap too often. A joint adaptation can also be performed.

In a fifth possible solution, the parameters c0 and $\theta_0$ are adapted per user based on the subscriber cost and volume to implement personalized subscriptions.

Figure 15:
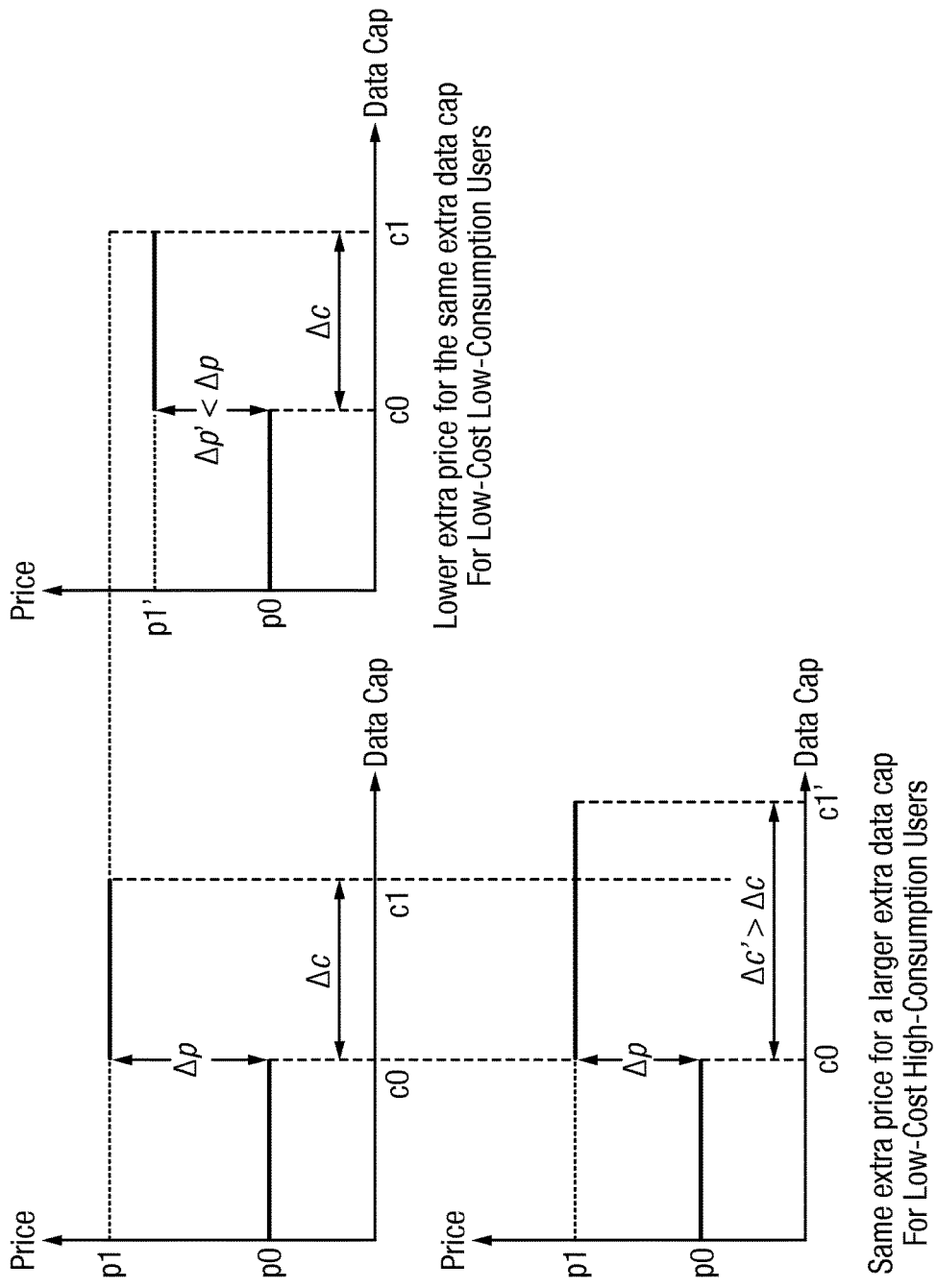
FIG. 15 shows adaptation of c0 and p0 for Flat up to a Cap, then Extra Cap for Fixed price.

FIG. 15 shows adaptation of c0 and p0 for "Flat up to a Cap, then Extra Cap for Fixed price".

In another possible solution, the Cap parameter $\Delta c$ and the price per extra Cap $\Delta p$ may be adapted to implement proactive discount by giving a higher $\Delta c$ Predictable Low-Cost High-Consumption Users or a lower $\Delta p$ for Predictable Low-Cost Low-Consumption Users e.g. when their data plan is almost expiring or as a way to implement a customer retention strategy to reduce churn when they are trying to cancel their subscription because they reach the data cap too often. A joint adaptation can also be performed.

Figure 16:
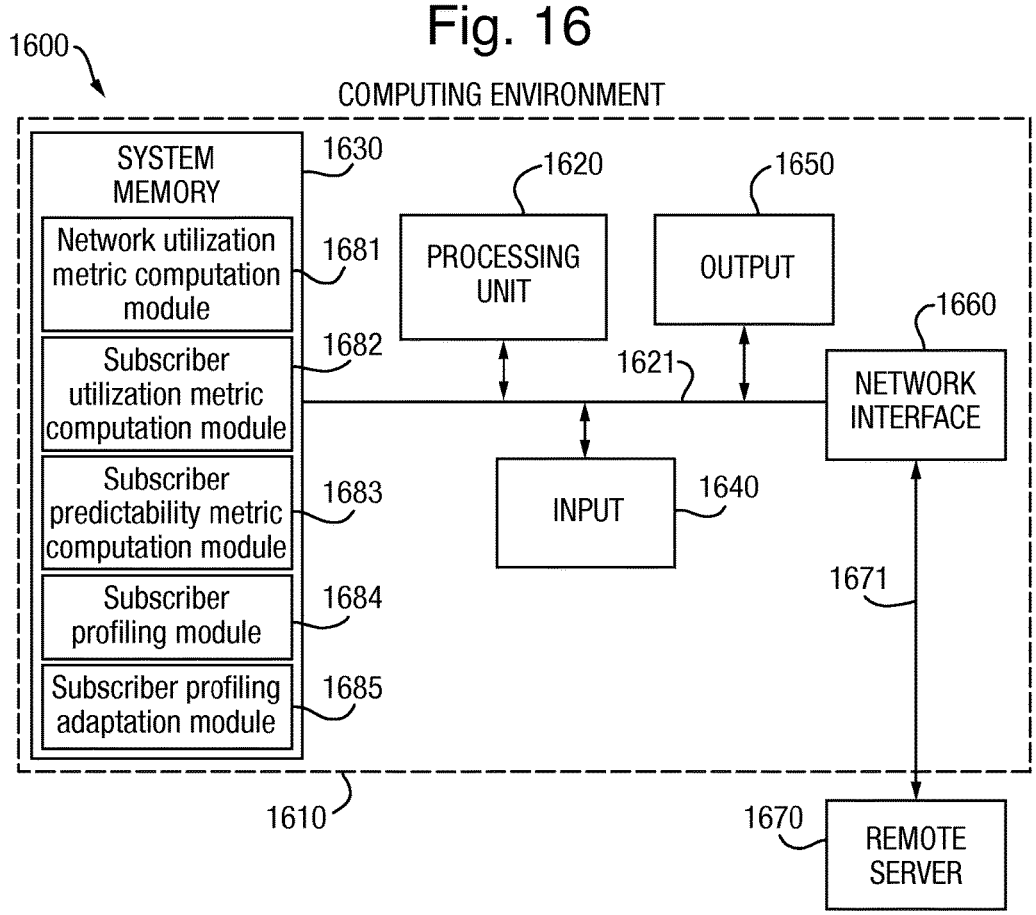
FIG. 16 is a block diagram showing an exemplary embodiment of a charging system according to the disclosed solution.

FIG. 16 is a block diagram showing an exemplary embodiment of a Subscription Adaptation Engine according to the disclosed solution in the form of computing system environment 1600.

Although as made clear above, the computing system environment 1600 is only one example of a suitable computing environment and is not intended to suggest any limitation as to the scope of use or functionality of the claimed subject matter. Further, the computing environment 1600 is not intended to suggest any dependency or requirement relating to the claimed subject matter and any one or combination of components illustrated in the example operating environment 1600.

An example of a device for implementing the previously described system includes a general purpose computing device in the form of a computer 1610. Components of computer 1610 can include, but are not limited to, a processing unit 1620, a system memory 1630, and a system bus 1621 that couples various system components including the system memory to the processing unit 1620. The system bus 1621 can be any of several types of bus structures including a memory bus or memory controller, a peripheral bus, and a local bus using any of a variety of bus architectures.

Figure 17:
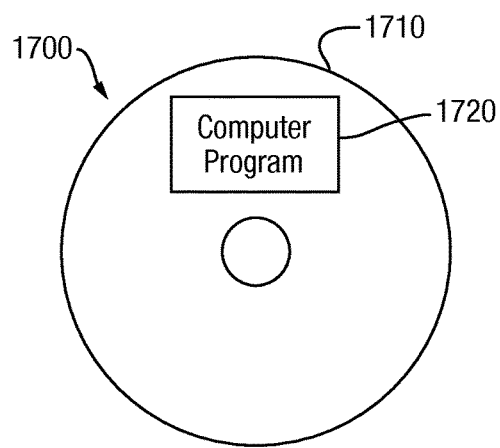
FIG. 17 shows a computer program product, comprising a non-transitory computer readable medium and a computer program stored on the computer readable medium

Computer 1610 can include a variety of transitory and non-transitory computer readable media. Computer readable media can be any available media that can be accessed by computer 1610. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1610. Communication media can embody computer readable instructions, data structures, program modules or other data in a modulated data signal such as a carrier wave or other transport mechanism and can include any suitable information delivery media. FIG. 17 shows computer readable media in the form of a computer program product 1710 including a computer program 1720.

The system memory 1630 can include computer storage media in the form of volatile and/or nonvolatile memory such as read only memory (ROM) and/or random access memory (RAM). A basic input/output system (BIOS), containing the basic routines that help to transfer information between elements within computer 1610, such as during start-up, can be stored in memory 1630. Memory 1630 can also contain data and/or program modules that are immediately accessible to and/or presently being operated on by processing unit 1620. By way of non-limiting example, memory 1630 can also include an operating system, application programs, other program modules, and program data.

The system memory 1630 may include a software module loaded in the memory and processable by the processing unit, or other circuitry which cause the SAE to compute a network utilization metric for a plurality of resource bins, each resource bin representing the network utilization at a network location within a time slot. The memory does also contain instructions which cause the SAE to compute a subscriber utilization metric for activities by a subscriber within the resource bins and to compute a subscriber predictability metric for the subscriber based on the subscriber utilization metric and network utilization metric. Further, the memory contains instructions which cause the SAE to perform subscriber profiling for the subscriber based on the subscriber utilization metrics and subscriber predictability metric; and to adapt subscription profile for the subscriber, thereby enabling service charging based on the adapted subscription profile.

More particularly, the SAE may include the following software modules for subscription adaptation based on network utilization:
- a network utilization metric computation module 1681 for computing a network utilization metric for a plurality of resource bins, each resource bin representing the network utilization at a network location within a time slot;
- a subscriber utilization metric computation module 1682 for computing a subscriber utilization metric for activities by a subscriber within the resource bins;
- a subscriber predictability metric computation module 1683 for computing a subscriber predictability metric for the subscriber based on the subscriber utilization metric and network utilization metric;
- a subscriber profiling module 1684 for performing subscriber profiling for the subscriber based on the subscriber utilization metrics and subscriber predictability metric; and
- a subscription profile adaptation module 1685 for adapting subscription profile for the subscriber, thereby enabling service charging based on the adapted subscription profile.

The computer 1610 can also include other removable/non-removable and volatile/nonvolatile computer storage media. For example, computer 1610 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1621 through a non-removable memory interface such as an interface, and a magnetic disk drive or optical disk drive can be connected to the system bus 1621 by a removable memory interface, such as an interface.

A user can enter commands and information into the computer 1610 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 1620 through user input 1640 and associated interface(s) that are coupled to the system bus 1621, but can be connected by other interface and bus structures, such as a parallel port, game port or a universal serial bus (USB).

A graphics subsystem can also be connected to the system bus 1621. In addition, a monitor or other type of display device can be connected to the system bus 1621 through an interface, such as output interface 1650, which can in turn communicate with video memory. In addition to a monitor, computers can also include other peripheral output devices, such as speakers and/or printing devices, which can also be connected through output interface 1650.

The computer 1610 can operate in a networked or distributed environment using logical connections to one or more other remote computers, such as remote server 1670, which can in turn have media capabilities different from device 1610. The remote server 1670 can be a personal computer, a server, a router, a network PC, a peer device or other common network node, and/or any other remote media consumption or transmission device, and can include any or all of the elements described above relative to the computer 1610. The logical connections depicted in FIG. 16 include a network 1671, such as a local area network (LAN) or a wide area network (WAN), but can also include other networks/buses.

When used in a LAN networking environment, the computer 1610 is connected to the LAN 1671 through a network interface or adapter. When used in a WAN networking environment, the computer 1610 can include a communications component, such as a modem, or other means for establishing communications over a WAN, such as the Internet. A communications component, such as a modem, which can be internal or external, can be connected to the system bus 1621 through the user input interface at input 1640 and/or other appropriate mechanism.

In a networked environment, program modules depicted relative to the computer 1610, or portions thereof, can be stored in a remote memory storage device. It should be noted that the network connections shown and described are exemplary and other means of establishing a communications link between the computers can be used.

FIG. 18 is a flowchart showing a method for subscription adaptation based on network utilization.

The method comprises a Subscription Adaptation Engine, SAE, performing the following:

A network utilization metric is computed for a plurality of resource bins in step 1810, each resource bin representing the network utilization at a network location within a time slot.

The network utilization metric may be any one of, or a combination of a Composite Available Capacity in LTE, a Pair Resource Block (PRB) utilization in LTE, a code and power utilization in UMTS, a hardware/backhaul/license utilization and number of active users including their profiles in LTE or UMTS systems.

The network utilization metric may also be temporarily modified for a certain bin to reflect an operator charging policy. The network utilization metric may be calculated for each carrier and/or Radio Access Technology, RAT. As an alternative, the network utilization metric may be obtained by integrating information from each carrier and/or RAT.

The time slots may be determined as a pre-defined time window divided into a specified number of time slots.

A subscriber utilization metric for activities by a subscriber within each of the plurality of resource bins is computed in step 1820.

The subscriber utilization metric may be calculated as the sum of number of bins wherein the subscriber has utilized mobile broadband. Another alternative is to calculate the subscriber utilization metric based on the data volume utilized for mobile broadband in each bin by the subscriber.

In step 1830 the SAE computes a subscriber predictability metric for the subscriber based on the subscriber utilization metric and network utilization metric. The subscriber predictability metric may include a classification into subscriber predictability groups based on average network utilization per bin and standard deviation of network utilization per bin.

Subscriber profiling is performed for the subscriber in step 1840, based on the subscriber utilization metrics and subscriber predictability metric;

Subscriber profiling may include segmenting into predictable high-network utilization subscribers when average network utilization per bin exceeds a first threshold value and standard deviation of network utilization per bin undercuts a second threshold value and segmenting into predictable low network utilization subscribers when average network utilization per bin undercuts the first threshold value and standard deviation of network utilization per bin undercuts the second threshold value.

In step 1850 adaption of subscription profile for the subscriber is done. Service charging based on the adapted subscription profile is thereby enabled.

Additionally, it should be noted that as used in this application, terms such as "component," "display," "interface," and other similar terms are intended to refer to a computing device, either hardware, a combination of hardware and software, software, or software in execution as applied to a computing device. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present solution. All such variations and modifications are intended to be included herein within the scope of the present solution.

The invention claimed is:

1. A method for performing subscription adaptation based on network utilization in a network at a Subscription Adaptation Engine, SAE, the method comprising:
    computing a network utilization metric for a plurality of resource bins of the network, wherein:
        each resource bin corresponds to a respective network location and a respective time slot; and
        the network utilization metric comprises network utilization data corresponding to at least one of the plurality of resource bins;
    computing a subscriber utilization metric for a subscriber of the network, wherein the subscriber utilization metric comprises subscriber utilization data based on activities by the subscriber within the at least one of the plurality of resource bins;

computing a subscriber predictability metric for the subscriber based on the subscriber utilization metric and the network utilization metric;

performing subscriber profiling for the subscriber based on the subscriber utilization metric and the subscriber predictability metric; and adapting a subscription profile for the subscriber based on the subscriber profiling, thereby enabling service charging based on the adapted subscription profile.

2. The method according to claim 1, wherein the time slots are determined as a pre-defined time window divided into a specified number of time slots.

3. The method according to claim 1, wherein the network utilization metric comprises at least one of a Composite Available Capacity in LTE, a Pair Resource Block (PRB) utilization in LTE, a code and power utilization in UMTS, a hardware/backhaul/license utilization in LTE and/or UMTS, and a plurality of active users comprising respective profiles in LTE and/or UMTS.

4. The method according to claim 1, further comprising: temporarily modifying the network utilization metric for at least one of the plurality of resource bins to reflect an operator charging policy.

5. The method according to claim 1, further comprising: calculating the network utilization metric for at least one carrier and/or at least one Radio Access Technology, RAT.

6. The method according to claim 1, further comprising: obtaining the network utilization metric by integrating information from at least one carrier and/or at least one Radio Access Technology, RAT.

7. The method according to claim 1, wherein the network utilization metric is based on infrastructure energy efficiency in the network.

8. The method according to claim 1, wherein computing the subscriber utilization metric for the subscriber of the network comprises calculating a sum of a number of resource bins of the plurality of resource bins wherein the subscriber has utilized mobile broadband.

9. The method according to claim 1, wherein computing the subscriber utilization metric for the subscriber of the network comprises calculating the subscriber utilization metric for the subscriber of the network based on a volume of data utilized for mobile broadband activity in each resource bin of the plurality of resource bins by the subscriber.

10. The method according to claim 1, wherein performing subscriber profiling for the subscriber based on the subscriber utilization metric and the subscriber predictability metric comprises classifying the subscriber into a subscriber segment based on the subscriber utilization metric and the subscriber predictability metric.

11. The method according to claim 10, wherein the subscriber predictability metric comprises a subscriber predictability group classification corresponding to the subscriber based on an average network utilization corresponding to the subscriber and the at least one of the plurality of resource bins and a standard deviation of network utilization corresponding to the subscriber and the at least one of the plurality of resource bins.

12. A method according to claim 10 wherein the step of performing subscriber profiling includes segmenting into:
predictable high-network utilization subscribers when average network utilization per bin exceeds a first threshold value and standard deviation of network utilization per bin undercuts a second threshold value; and segmenting into predictable low network utilization subscribers when average network utilization per bin undercuts the first threshold value and standard deviation of network utilization per bin undercuts the second threshold value.

13. A Subscription Adaptation Engine, SAE, for subscription adaptation based on network utilization in a network, comprising:

a processor; and a memory comprising program code executed by the processor to:

compute a network utilization metric for a plurality of resource bins of the network, wherein:

each resource bin corresponds to a respective network location and a respective time slot; and the network utilization metric comprises network utilization data corresponding to at least one of the plurality of resource bins;

compute a subscriber utilization metric for a subscriber of the network, wherein the subscriber utilization metric comprises subscriber utilization data based on activities by the subscriber within the at least one of the plurality of resource bins;

compute a subscriber predictability metric for the subscriber based on the subscriber utilization metric and the network utilization metric;

perform subscriber profiling for the subscriber based on the subscriber utilization metric and the subscriber predictability metric; and adapt a subscription profile for the subscriber based on the subscriber profiling, thereby enabling service charging based on the adapted subscription profile.

14. The SAE according to claim 13, wherein the time slots are determined as a pre-defined time window divided into a specified number of time slots.

15. The SAE according to claim 13, wherein the network utilization metric comprises at least one of a Composite Available Capacity in LTE, a Pair Resource Block (PRB) utilization in LTE, a code and power utilization in UMTS, a hardware/backhaul/license utilization in LTE and/or UMTS, and a plurality of active users comprising respective profiles in LTE and/or UMTS.

16. The SAE according to claim 13, wherein the SAE is further configured to temporarily modify the network utilization metric for at least one of the plurality of resource bins to reflect an operator charging policy.

17. The SAE according to claim 13, wherein the SAE is further configured to calculate the network utilization metric for at least one carrier and/or at least one Radio Access Technology, RAT.

18. The SAE according to claim 13, wherein the SAE is further configured to obtain the network utilization metric by integrating information from at least one carrier and/or at least one Radio Access Technology, RAT.

19. The SAE according to claim 13, wherein the network utilization metric is based on infrastructure energy efficiency in the network.

20. The SAE according to claim 13, wherein the SAE is further configured to calculate the subscriber utilization metric as a sum of a number of resource bins of the plurality of resource bins wherein the subscriber has utilized mobile broadband.

21. The SAE according to claim 13, wherein the SAE is further configured to calculate the subscriber utilization metric for the subscriber of the network based on a volume of data utilized for mobile broadband activity in each resource bin of the plurality of resource bins by the subscriber.

22. The SAE according to claim 13, wherein subscriber profiling includes classifying the subscriber into a subscriber segment based on the subscriber utilization metric and the subscriber predictability metric.

23. The SAE according to claim 22, wherein the subscriber predictability metric comprises a subscriber predictability group classification corresponding to the subscriber based on an average network utilization corresponding to the subscriber and the at least one of the plurality of resource bins and a standard deviation of network utilization corresponding to the subscriber and the at least one of the plurality of resource bins.

24. The SAE according to claim 22 wherein performing subscriber profiling includes segmenting into:
predictable high-network utilization subscribers when average network utilization per bin exceeds a first threshold value and standard deviation of network utilization per bin undercuts a second threshold value; and
segmenting into predictable low network utilization subscribers when average network utilization per bin undercuts the first threshold value and standard deviation of network utilization per bin undercuts the second threshold value.

25. An Online Charging System, OCS, including the SAE according to claim 13, wherein the OCS is further configured to perform service charging based on the adapted subscription profile.

26. The OCS according to claim 25, wherein the service charging includes rating the service based on the adapted subscription profile.

27. A Subscription Adaptation Engine, SAE, for subscription adaptation, the SAE comprising:
a processor circuitry;
a memory containing instructions that, when executed by the processor circuitry, cause the Subscription Adaptation Engine to:
compute a network utilization metric for a plurality of resource bins, wherein:
each resource bin corresponds to a respective network location and a respective time slot; and
the network utilization metric comprises network utilization data corresponding to at least one of the plurality of resource bins;
compute a subscriber utilization metric for a subscriber, wherein the subscriber utilization metric comprises subscriber utilization data based on activities by the subscriber within the at least one of the plurality of resource bins;
compute a subscriber predictability metric for the subscriber based on the subscriber utilization metric and the network utilization metric;
perform subscriber profiling for the subscriber based on the subscriber utilization metric and the subscriber predictability metric; and
adapt a subscription profile for the subscriber based on the subscriber profiling, thereby enabling service charging based on the adapted subscription profile.

28. A computer program product comprising a non-transitory computer readable storage medium storing program code, which when run in a computer being configured as a Subscription Adaption Engine, the program code causes the computer to perform the following steps:
computing a network utilization metric for a plurality of resource bins, wherein:
each resource bin corresponds to a respective network location and a respective time slot; and
the network utilization metric comprises network utilization data corresponding to at least one of the plurality of resource bins;
computing a subscriber utilization metric for a subscriber, wherein the subscriber utilization metric comprises subscriber utilization data based on activities by the subscriber within the at least one of the plurality of resource bins;
computing a subscriber predictability metric for the subscriber based on the subscriber utilization metric and the network utilization metric;
performing subscriber profiling for the subscriber based on the subscriber utilization metric and the subscriber predictability metric; and
adapting a subscription profile for the subscriber based on the subscriber profiling, thereby enabling service charging based on the adapted subscription profile.

* * * * *